United States Patent [19]

Sugihara et al.

[11] Patent Number: 4,700,338

[45] Date of Patent: Oct. 13, 1987

[54] AUTOMATIC LOADING DISC PLAYER

[75] Inventors: Masanori Sugihara; Atsushi Kurosawa; Akihiko Okamoto, all of Kawagoe; Akira Bessho, Tokorozawa; Kouji Shimoda, Tokorozawa; Kenji Okuda, Tokorozawa; Haruo Kama; Kazuo Kobayashi, both of Kawagoe, all of Japan

[73] Assignee: Pioneer Electronic Corporation, Tokyo, Japan

[21] Appl. No.: 721,940

[22] Filed: Apr. 11, 1985

[30] Foreign Application Priority Data

Apr. 11, 1984 [JP] Japan ................................. 59-072041
Sep. 25, 1984 [JP] Japan ................................. 59-200146
Sep. 25, 1984 [JP] Japan ................................. 59-200151
Sep. 25, 1984 [JP] Japan ................................. 59-200152

[51] Int. Cl.⁴ ........................ G11B 3/00; G11B 25/04
[52] U.S. Cl. ............................................... 369/77.1
[58] Field of Search ................ 369/77.1, 77.2, 75.1

[56] References Cited

U.S. PATENT DOCUMENTS 3,740,056  6/1973  Nuttall et al. ................... 369/77.1
3,802,710  4/1974  Mazza ............................. 369/77.1
4,439,852  3/1984  Hughes ........................... 369/77.2
4,509,158  4/1985  Kang ............................... 369/77.2

FOREIGN PATENT DOCUMENTS 65704  6/1978  Japan ................................. 369/77.1

Primary Examiner—Steven L. Stephan
Attorney, Agent, or Firm—Fleit, Jacobson, Cohn & Price

[57] ABSTRACT

An automatic disc player including a housing having an elongated slot through which a disc is to be inserted into the housing, disc playback means accommodated within the housing, disc carrier means operative to convey the disc toward a predetermined position along a predetermined path within the housing after the disc is inserted through the slot in the housing, the disc carrier mechanism having a surface portion on which the a disc is to be placed, and alignment operative to move the disc correctly to the predetermined position after the disc is conveyed toward the predetermined position by the disc carrier means, wherein the alignment comprises a pair of position holding device disposed on both sides of the aforesaid predetermined path and engageable with an edge portion of the disc concurrently at at least two locations on a plane substantially parallel with the above mentioned surface portion of the disc carrier, and biasing device urging the locations to move toward the edge portion of the disc while the disc is being engaged by the position holders.

8 Claims, 25 Drawing Figures

AUTOMATIC LOADING DISC PLAYER

FIELD OF THE INVENTION

The present invention relates to disc players and, particularly, to an automatic disc player which is equipped with means to automatically convey a disc to a position ready to be played back.

BACKGROUND OF THE INVENTION

Disc players to reproduce the information recorded on, for example, digital audio discs are now familiar as household appliances. These disc players are however originally designed on the assumption that they should do justice to indoor placement and have thus been unsuitable for outdoor uses or for installation on motor vehicles. In order that disc players of the existing designs be suitable use outdoors or in motor vehicle, they must be more compact in construction, more resistive to shocks and vibrations, more proof against an ingress of dust, and more easy to load the discs to be played back.

The present invention contemplates provision of an automatic disc player which will meet these requirements for disc players adapted for outdoor and automotive uses.

SUMMARY OF THE INVENTION

In accordance with the present invention, there is provided an automatic disc player including a housing having an elongated slot through which a disc is to be inserted into the housing, disc playback means accommodated within the housing, disc carrier means operative to convey the disc toward a predetermined position along a predetermined path within the housing after the disc is inserted through the slot in the housing, the disc carrier means having a surface portion on which the disc is to be placed, and alignment means operative to move the disc correctly to the predetermined position after the disc is conveyed toward the predetermined position by the disc carrier means, wherein the alignment means comprises a pair of position holding means disposed on both sides of the aforesaid predetermined path and engageable with an edge portion of the disc concurrently at four locations on a plane substantially parallel with the above mentioned surface portion of the disc carrier means, and biasing means urging the position holding means to move toward the edge portion of the disc while the disc is being engaged by the position holding means. The disc player according to the present invention may further include drive means operative to drive the disc carrier means for movement with respect to the housing, the drive means comprising a stationary member fast on the housing, an electric motor supported on the stationary member and having an output shaft, a spring retainer element fast on the stationary member, and a helical torsion spring having a helical portion received on the retainer element and having one of its end portions engaging the output shaft of the motor and the other of its end portions engaging the stationary member for urging the output shaft of the motor in a predetermined direction with respect to the housing. The disc player according to the present invention may further include, independently of or in combination with such drive means, a guide member fixedly positioned rearwardly of the slot in the housing and formed with a slot extending substantially coextensively with the slot in the housing for passing a disc through the slot in the guide member when the disc is being conveyed outwardly from the housing.

BRIEF DESCRIPTION OF THE DRAWINGS

The features and advantages of an automatic disc player according to the present invention will be more clearly appreciated from the following description taken in conjunction with the accompanying drawings in which like reference numerals designate similar or corresponding assemblies, units, members and elements and in which.

DESCRIPTION OF THE PREFERRED EMBODIMENTS

Figure 1:
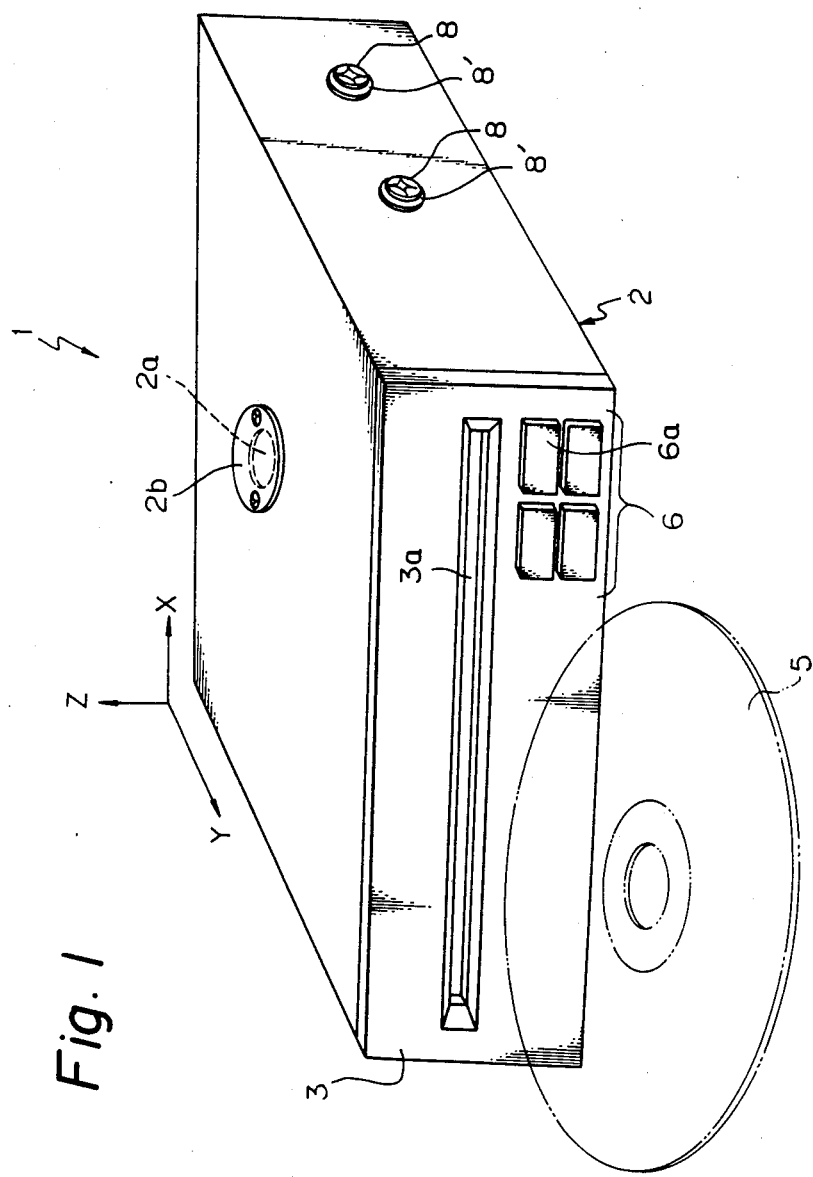
FIG. 1 is a perspective view showing the overall external construction of an automatic disc player embodying the present invention.

Referring to the drawings, first particularly to FIG. 1 thereof, an automatic disc player embodying the present invention, as denoted in its entirety by reference numeral 1 comprises a housing 2 having a front panel 3 as well as side panels and a rear panel. The front panel 3 of the housing 1 is formed with a horizontally elongated slot 3a through which a video and/or audio disc 5 to be played back can be loaded rearwardly into the automatic disc player. On the front panel 3 are provided pushbuttons such as "START" and "EJECT" buttons as is customary.

It may be noted that the rear direction of the automatic disc player as herein referred to occurs in a horizontal fore-and-aft direction indicated by arrow Y in FIG. 1. Thus, the direction indicated by arrow X in FIG. 1 is a horizontal lateral direction of the automatic disc player and the direction of arrow Z in FIG. 1 is a vertical direction of the automatic disc player. The direction of the arrow Z in particular is normal to the plane on which the disc 5 is to be positioned within the housing 2 during playback operation. It may be further noted that the video and/or audio disc 5 herein shown is assumed, by way of example, to be 5 inches in diameter and of the type which uses laser beams when in writing and reading information.

The internal mechanical construction of the automatic disc player is shown in detail in FIGS. 2 to 6. Of these FIGS. 2 to 6, FIGS. 2 to 5 show the initial condition of the automatic disc player prior to the start of a playback operation. As seen in FIGS. 2 to 6, the housing 2 has accommodated therein a chassis structure 7 which is composed of two chassis members 7a and 7b. These chassis members 7a and 7b are rigidly coupled together by suitable fastening means (not shown) and constitute a principal support structure in the housing 2. The chassis structure 7 as a whole is secured to the housing 2 by means of four screws 8 and rubber bushings 8' respectively attached to the screws 8 as illustrated to an enlarged scale in FIG. 7.

Within the housing 2 is further accommodated a tray structure 10 which is movable forwardly and backwardly with respect to the housing 2. The tray structure 10 is composed of a generally L-shaped base member 10a and a left side member 10b which is securely attached to a left side wall portion of the base member 10a by means of, for example, screws as will be best seen in FIG. 6. The main chassis member 7a of the chassis structure 7 has a right side wall portion, to which a bracket member 12 is securely attached also by means of, for example, screws as shown. The bracket member 12 is formed with a pair of slots 12a each elongated in the direction of the arrow Y. The base member 10a of the tray structure 10 has a right side wall portion having a pair of guide pins 10c. The guide pins 10c project from the side wall portion of the base member 10a rightwardly of the housing 2 and are slidably received in these slot 12a, respectively, in the bracket member 12, thus allowing the tray structure 10 to move forwardly and backwardly with respect to the bracket member 12 and accordingly to the chassis structure 7.

On the right and left sides of the chassis structure 7 are positioned a pair of movable members 13 and 14 each of which is constructed of, for example, a rigid plastic. The right movable member 13 is located between the tray structure 10 and the bracket member 12 and is formed with a pair of slots 13a also elongated each in the direction of the arrow Y. The guide pins 10c on the right side wall portion of the base member 10a extend through these elongated slots into the slots 12a in the bracket member 12, as will be best seen in FIG. 5. The movable member 13 is thus movable forwardly and backwardly along the slots 13a therein as well as the slots 12a in the bracket member 12 with respect to the tray structure 10 and accordingly to the chassis structure 7. On the other hand, the movable member 14 positioned on the left side of the tray structure 10 is supported slidably on a guide bar 15 secured to the chassis structure 7. The guide bar 15 extends in the direction of the arrow Y and is securely connected at its opposite ends to lug portions projecting from the left side wall portion of the main chassis member 7a as will be best seen in FIG. 6. The left movable member 14 is also formed with a pair of slots 14a each elongated in the direction of the arrow Y, and the left side member 10b of the tray structure 10 has a pair of guide pins 10e on its left side wall portion. The pins 10e on the side member 10b are respectively aligned with the pins 10c on the base member 10a and, likewise, the slots 14a in the movable member 14 are respectively aligned with the slots 13a in the right movable member 13 each in the direction of the arrow X. The guide pins 10e projects from the side member 10b leftwardly of the housing 2 and are slidably received in the slots 14a, respectively, in the movable member 14, as will be best seen in FIG. 4. The movable member 14 is thus movable forwardly and backwardly along the slots 14a with respect to the tray structure 10 and accordingly to the chassis structure 7. Though not seen in the drawings, the tray structure 10 is slidably supported on the guide bar 15 at two locations of the structure 10 which are spaced apart from each other in the direction of the arrow Y.

In the neighborhood of the rear end of the tray structure 10 is positioned an interlocking shaft 17 which extends in the direction of the arrow X. The interlocking shaft 17 is pivotally supported on the tray structure 10 through appropriate holed provided in the structure 10 and has a pair of arms 17a and 17b securely carried at its opposite ends, respectively, by means of, for example, screws or studs. Guide pins 17c and 17d project toward each other from these arms 17a and 17b, respectively, and are aligned together in the direction of the arrow X. These guide pins 17c and 17d are slidably received in vertically elongated slots 13b and 14b formed in rear portions of the right and left movable members 13 and 14, respectively. The slots 13b and 14b are aligned with each other in the direction of the arrow X.

Figure 3:
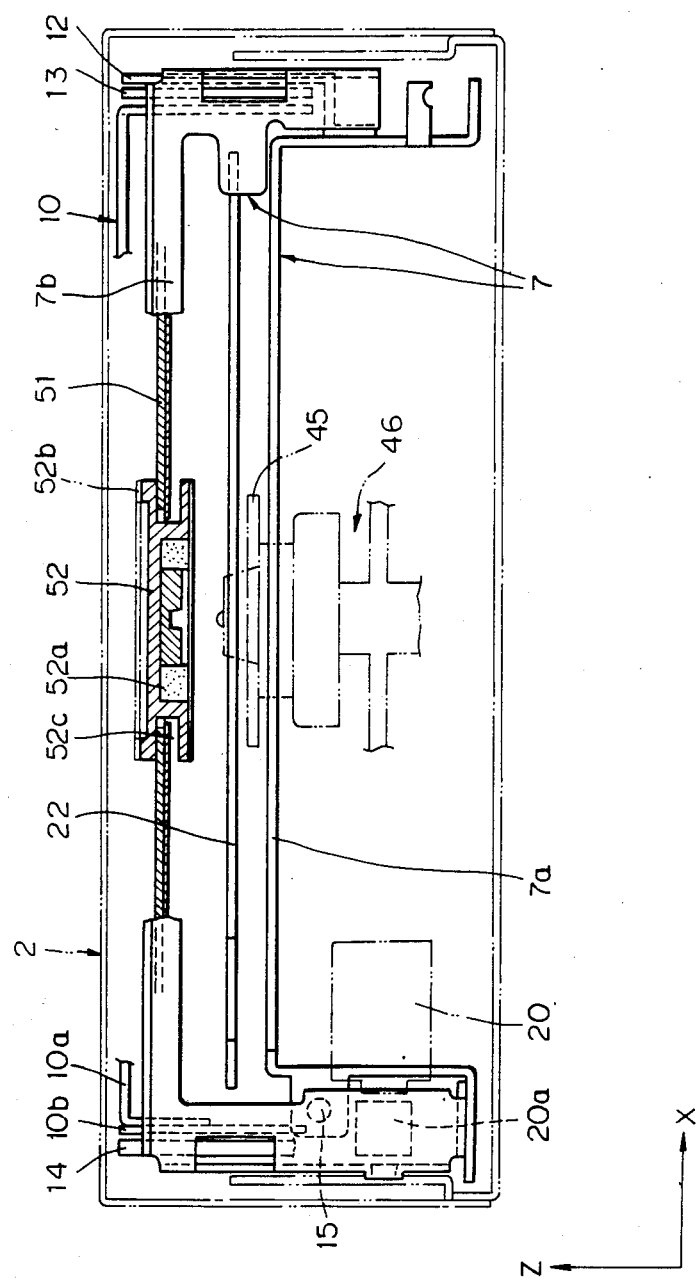
FIG. 3 is a front elevation view showing the internal construction of the automatic disc player embodying the present invention.
Figure 4:
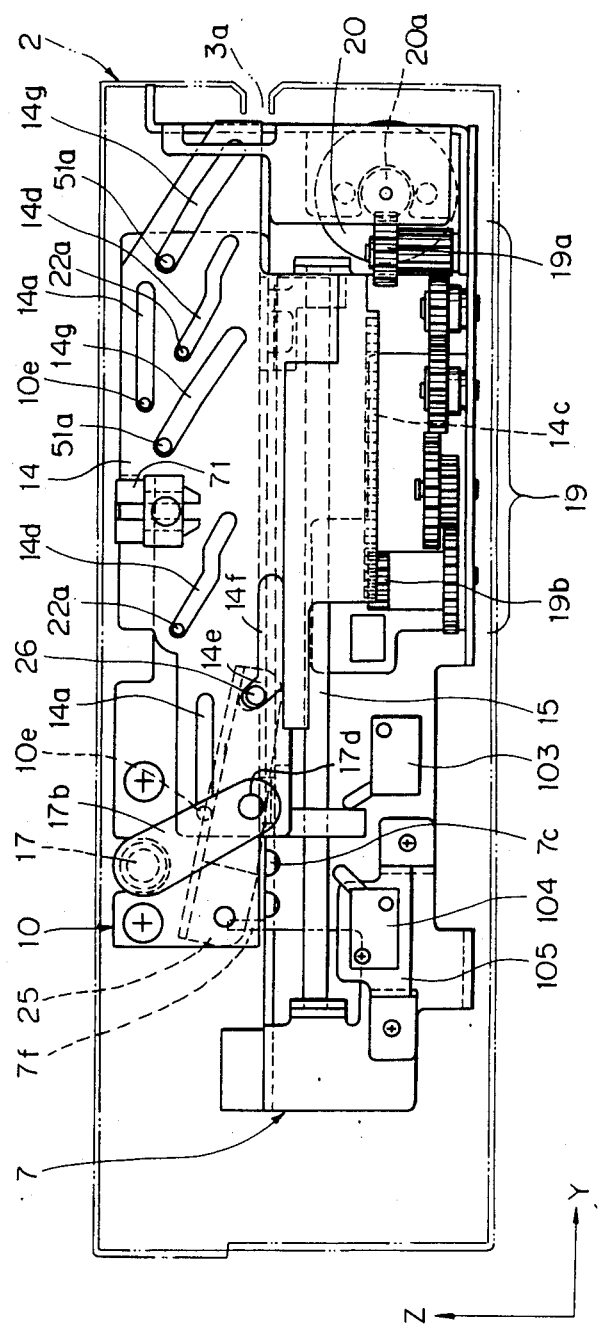
FIG. 4 is a side elevation view showing the internal construction of the automatic disc player embodying the present invention as viewed from one side of the player.

On the left side wall portion of the main chassis member 7a is supported a reduction gear unit 19 including a certain number of gears which are in mesh with one another and which have respective axes of rotation in vertical directions. As shown in FIG. 4, these gears include a first-stage gear 19a and a final-stage gear 19b, A main drive motor 20 of the reversible design is held in position in front of this reduction gear unit 19 and has an output shaft having an axis of rotation in the direction of the arrow X. The motor output shaft has securely carried thereon a worm gear 20a (FIGS. 3 and 4) which is held in mesh with the first-stage gear 19a of the reduction gear unit 19. The final-stage gear 19b of the reduction gear unit 19 is held in mesh with a rack member 14c which is secured to or forms part of the left movable member 14 as will be seen in FIG. 4. The rack member 14c is formed along the lower end of the movable member 14 and extends in the direction of the arrow Y. The location at which the rack member 14c is thus in mesh with the final-stage gear 19b is located intermediate or, preferably approximately at a middle point, between the above mentioned two locations of the tray structure 10 which are spaced apart from each other in the direction of the arrow Y. The interlocking shaft 17, reduction gear unit 19 and main drive motor 20 thus arranged as well as the members and elements carried thereon form drive means operable for driving the right and left movable members 13 and 14 to move back and forth each in the direction of the arrow Y with respect to each of the chassis and tray structures 7 and 10 as will be better understood as the description proceeds.

Figure 17:
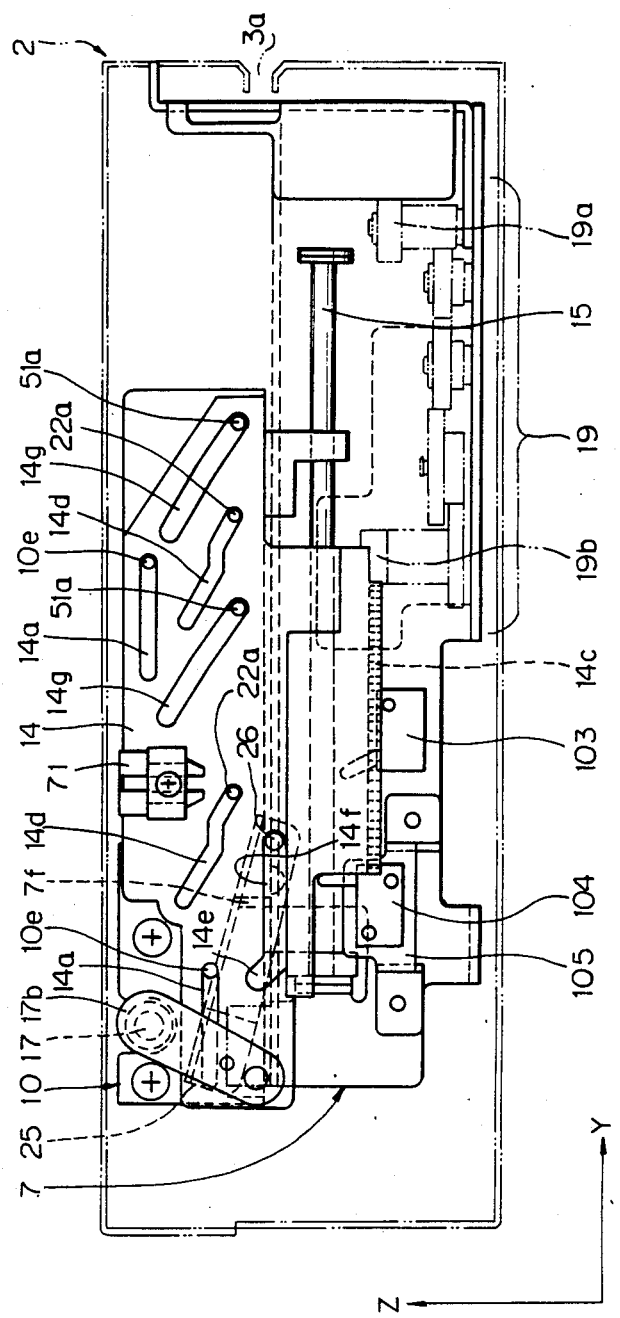

The tray structure 10 and the right and left movable members 13 and 14 as above described form part of disc carrier means of the automatic disc player embodying the present invention. In the embodiment herein shown, the disc carrier means further comprises a generally U-shaped disc transfer plate 22 which is movably positioned below the tray structure 10 and between the movable members 13 and 14. This disc transfer plate 22 is moved to a position above the turntable (indicated at 45 in FIG. 3) to transfer a disc 5 to the turntable and is thus generally U-shaped to accommodate an upper portion of the turntable when moved to such a position. The disc transfer plate 22 has attached to its upper face on which a disc 5 is to be received an appropriate soft protective lining or coating such as, for example, a web 23 of felt (FIG. 6) to protect the surface of the disc from direct contact with the transfer plate surface. The disc transfer plate 22 has two pairs of guide pins projecting from side lug portions of the transfer plate 22, the pins consisting of a pair of front guide pins 22a aligned with and extending away from each other in the vicinity of the front end of the transfer plate and a pair of rear guide pins 22a' aligned with and extending away from each other in the vicinity of the front end of the transfer plate 22. The front guide pins 22a are slidably received in vertically elongated slots 10f located in a front end portion of the right side wall of the base member 10a of the tray structure 10 and a front end portion of the side member 10b of the tray structure 10. Similarly, the rear guide pins 22a' are slidably received in vertically elongated slots 10f' located in a rear end portion of the right side wall of the base member 10a and a front end portion of the side member 10b. The slots 10f and 10f' in the base member 10a are respectively aligned with the slots 10f and 10f' in the side member 10b in the direction of the arrow X. The disc transfer plate 22 is thus movable upwardly and downwardly with respect to the tray structure 10 and accordingly to the chassis structure 7 over distances limited by the lengths of the slots 10f and 10f'. The front guide pins 22a are passed through the slots 10f in the tray structure 10 and further extend through stepping cam holes 13d and 14d formed in the right and left movable members 13 and 14, respectively. Likewise, the rear guide pins 22a' are passed through the slots 10f' in the tray structure 10 and further extend through stepping cam holes 13d' and 14d' formed in the right and left movable members 13 and 14, respectively. The slots 13d and 13d' are respectively aligned with the slots 14d and 14d' each in the direction of the arrow X. As will be best seen in FIGS. 4 and 5, each of these cam holes 13d, 13d', 14d and 14d' consists of a front ramp portion slightly slanting upwardly and rearwardly, a horizontal intermediate portion extending in the direction of the arrow Y from the rear end of the front ramp portion, and a rear ramp portion slightly slanting upwardly from the rear end of the intermediate portion. Thus, the disc transfer plate 22 is movable on a horizontal plane with respect to the movable members 13 and 14 when the guide pins 22a are located in the intermediate portions of the cam holes 13d and 14d in the movable members 13 and 14, respectively. With the guide pins 22a located either in the front ramp portions or in the rear ramp portions of the cam holes 13d and 14d and the guide pins 22a' located in the front or rear ramp portions of the cam holes 13d and 14d, respectively, the disc transfer plate 22 is movable upwardly above or downwardly below the above mentioned horizontal plane. When the guide pins 22a and 22a' are located in the front or rear ramp portions of the respectively associated cam holes, the disc transfer plate 22 is thus movable upwardly above or downwardly with respect to the movable members 13 and 14 depending upon the direction in which the transfer plate 22 is to be moved in the direction of the arrow Y. The guide pins 22a and 22a' and the respectively associated cam holes in the movable members 13 and 14 constitute means which allow the disc transfer plate 22 to move upwardly or downwardly across a horizontal plane which is fixed with respect to the turntable and which is movable with respect to each of the chassis and tray structures 7 and 10 and to the turntable as will be understood more clearly. It may be herein noted that the foremost and lowermost ends of the cam holes 13d, 14d, 13d' and 14d' in the movable members 13 and 14 as shown in FIG. 17 are located so that, when the disc transfer plate 22 is carried on the movable members 13 and 14 with these pins located at these ends of the cam holes, the upper disc-carrying face of the plate 22 is slightly lower than a plane flush with the upper end face of the turntable as will also be understood more clearly as the description proceeds. The disc transfer plate 22 is held against movement with respect to the tray structure in the direction of the arrow Y with the guide pins 22a and 22a' received in the vertically elongated slots 10f and 10f', respectively, in the tray structure 10.

During loading of a disc into the automatic disc player, the disc transfer plate 22 is fixedly held in position with respect to the tray structure 10 until the disc 5 placed on the transfer plate 22 being moved with respect to the chassis structure 7 reaches a position having its center axis aligned with the center axis of the turntable. When the disc on the disc transfer plate 22 reaches such a position with respect to the turntable, the disc transfer plate 22 is unlocked from the tray structure 10, as will be understood more clearly as the description proceeds. Thus, the automatic disc player embodying the present invention further comprises lock/unlock means adapted to have the disc transfer plate 22 locked to and unlocked from the tray structure 10 depending upon the position of the tray structure 10 with respect to the turntable and accordingly to the chassis structure 7.

Figure 6:
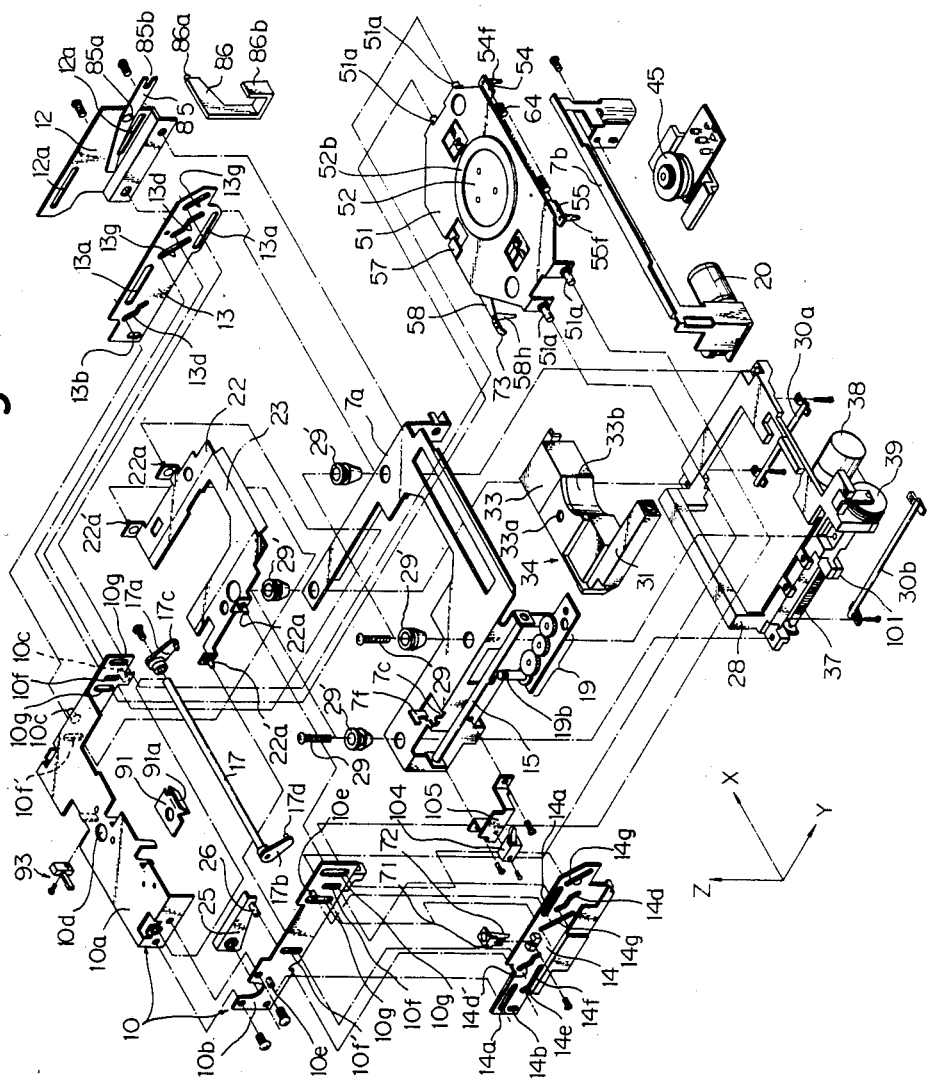
FIG. 6 is an exploded view of the internal construction of the automatic disc player embodying the present invention.
Figure 7:
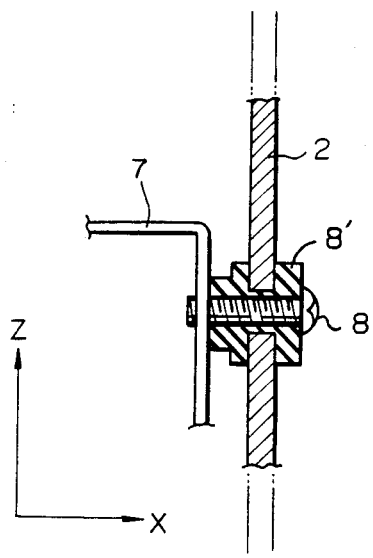
FIG. 7 is a sectional view showing the arrangement in which a chassis structure forming part of the automatic disc player embodying the present invention is supported in the housing structure.

As shown in FIGS. 4 and 6, such lock/unlock means of the automatic disc player embodying the present invention comprises a lever 25 pivotally connected at one end to a rear end portion of the side member 10b of the tray structure 10. The lever 25 is thus rockable about an axis in the direction of the arrow X and has a locking pin 26 projecting from a foremost leading end portion of the lever 25 in parallel with the axis of rotation of the lever 25. Depending upon the position of the movable member 14 with respect to the tray structure 10, the locking pin 26 thus projecting from the lever 25 is selectively received either in a cutout 7c formed in the main chassis member 7a or in a cam slot 14e formed in the left movable member 14. The cutout 7c in the main chassis member 7a is located at the upper end of the left side wall portion of the main chassis member 7a as shown in FIG. 6, and the cam slot 14e in the movable member 14 is located on a plane flush with the upper surface of the main chassis member 7a as will be seen from FIG. 4. The cam slot 14e in the movable member 14 forms a rear end portion of a slot 14f also formed in the left movable member 14 and merges rearwardly and slightly upwardly out of the slot 14f which is elongated in the direction of the arrow Y as will be best seen in FIG. 4. The locking pin 26 on the lever 25 is thus movable into this elongated slot 14f to allow the movable member 14 to move with respect to the tray structure 10 or vice verse. The elongated slot 14f is located so that the slot 14f is flush with the cutout 7c when the tray structure 10 assumes a predetermined position above the turntable. The predetermined position of the tray structure 10 as herein referred to is such that, with the tray structure 10 in this position, the disc 5 placed on the disc transfer plate 22 prior to the start of playback operation has its center axis aligned with the center axis of the turntable over which the transfer plate 22 is positioned. While the tray structure 10 carried on the movable members 13 and 14 is being moved toward such a predetermined position in the direction of the arrow Y with the locking pin 26 located in the cam slot 14e, the disc transfer plate 22 is locked to the tray structure 10 and is prohibited from being moved vertically with respect to the tray structure 10. Once the tray structure 10 is moved to such a position above the turntable, the locking pin 26 on the lever 25 is allowed to enter the elongated slot 14f in the movable member 14 and permits the tray structure 10 with respect to the movable member 14 along the elongated slot 14f. This in turn permits the disc transfer plate 22 to move vertically (viz., downwardly) with respect to the tray structure 10 with the guide pins 22a and 22a' of the transfer plate 22 moving along the stepping holes 13d, 14d, 13d' and 14d' in the movable members 13 and 14 as well as the vertically elongated slots 10f and 10f' *in the tray structure 7. The location of the cam slot 14e* in the movable member 14 is further such that the slot 14e is allowed to align the cutout 7c in the chassis member 7a in the direction of the arrow X when the tray structure 10 is moved to the predetermined position above the turntable. When the tray structure 10 reaches the predetermined position, the locking pin 26 on the lever 25 is thus received in the cutout 7c in the chassis member 7a while the pin 26 is moving from the cam slot 14e into the elongated slot 14f. This provides locking engagement between the chassis and tray structures 7 and 10 through the locking pin 26 in the cutout 7c so that the tray structure 10 is locked to the housing 2.

The combination of the above described drive and lock/unlock means as well as the chassis and tray structures 7 and 10, movable members 13 and 14 and disc transfer plate 22 forms disc transfer means to move a disc to a predetermined position with respect to the turntable in the automatic disc player embodying the present invention.

The automatic disc player embodying the present invention further comprises disc playback means adapted to play back the disc thus moved to the predetermined position above the turntable.

Figure 8:
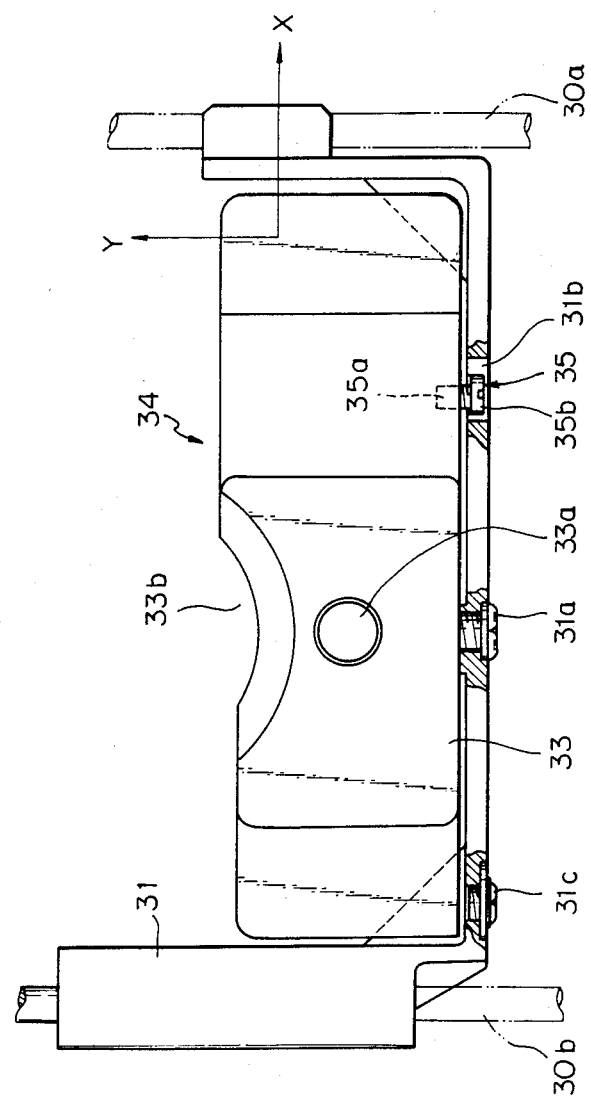
FIG. 8 is a plan view showing the arrangement of a carriage assembly also forming part of the automatic disc player embodying the present invention.
Figure 9:
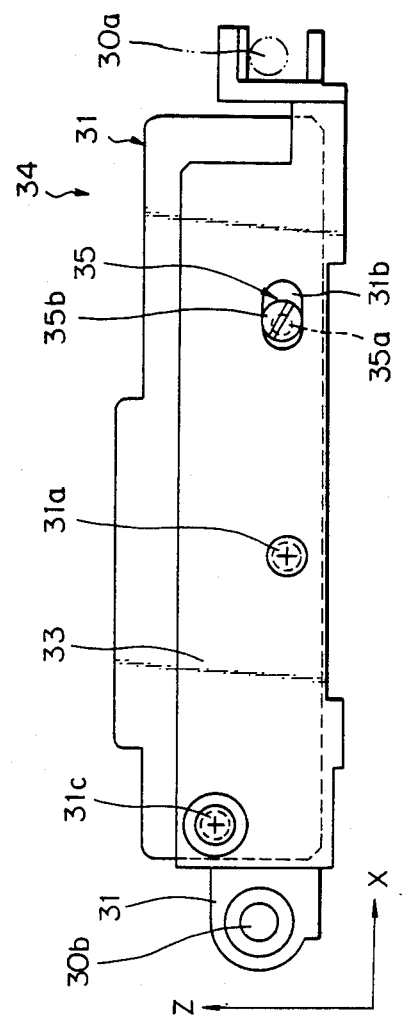
FIG. 9 is a rear end view of the carriage assembly illustrated in FIG. 8.
Figure 10:
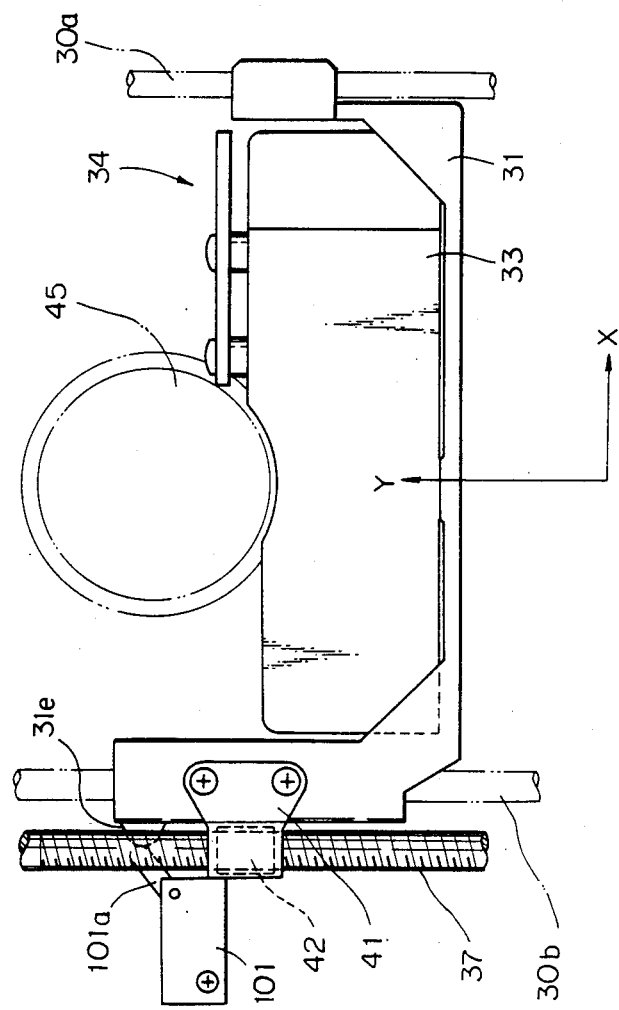
FIG. 10 is a view similar to FIG. 8 but additionally shows drive means for the carriage assembly.

The disc playback means is also enclosed within the housing 2 and comprises a generally U-shaped support structure 28 positioned below the chassis structure 7 as shown in FIG. 6. The support structure 28 is securely attached to the lower face of the main chassis member 7a of the chassis structure 7 by means of four screws 29 and rubber bushings 29'. To this support structure 28 are secured a pair of guide rods 30a and 30b which are spaced apart in parallel from each other in the direction of the arrow X and which extend in the direction of the arrow Y. These guide rods 30a and 30b are securely attached to the support structure 28 by means of, for example, screws and fittings as shown. A generally U-shaped slider 31 has two side portions slidably received on these guide rods 30a and 30b, respectively, as shown in FIGS. 8 to 10 and is thus movable back and forth in the direction of the arrow Y with respect to the chassis structure 7. The slider 31 has a generally box-shaped casing 33 rotatably mounted on an intermediate portion of the slider 31 by means of a screw or pivot element 31a which has a center axis in the direction of the arrow Y. The casing 33 is thus pivotally movable with respect to the slider 31 about an axis parallel with the direction of movement of the slider 31 with respect to the chassis structure 7. The casing 33 has enclosed therein optical signal pickup means including an objective lens 33a fitted in the upper wall portion of the casing 33. The objective lens 33a forming part of the optical signal pickup means is provided to have a laser spot focussed on the surface of the disc placed on the turntable for reading information from the record surface of the disc. The optical signal pickup means of this nature is per se well known in the art and, as such, detailed construction thereof is not herein illustrated.

As shown in FIGS. 8 and 9, the slider 31 has in its intermediate portion a slot 31b which is elongated in a direction which passes through the center axis of the screw or pivot element 31a. An offset-head screw 35 has its threaded step portion 35a driven into a rear wall portion of the casing 33 with its circular head portion 35b received in the elongated slot 31b and offset from the stem portion 35a. Thus, the casing 33 is driven to turn minutely about the center axis of the screw or pivot element 31a by turning the offset-head screw 35 in either direction about the axis of the screw 35. The offset-head screw 35 and the slot 31b provide means to adjust the angular position of the casing 33 about the center axis of the screw or pivot element 31a and accordingly calibrate the tangential position of the pickup means with respect to the disc to be played back. After the optical signal pickup means is thus calibrated, the casing 33 is secured the slider 31 by tightening a set screw 31c fitted through the slider 31 into the casing 33 as shown.

The base member 10a of the tray structure 10 is formed with a circular opening 10d as shown in FIGS.

2 and 6. The opening 10d in the tray structure 10 is located to be vertically aligned with the objective lens 33a in the casing 33 when the tray structure 10 is in the above mentioned predetermined position above the turntable and concurrently the casing 33 is in a predetermined home position wr;th respect to the turntable. The home position of the casing 33 is the position which the casing 33 assumes when the signal pickup means in the casing 33 is ready to operate on the disc placed on the turntable. The opening 10d thus formed in the tray structure 10 provides an access to the outer surface of the objective lens 33a in the casing 33 and enables the user of the player to wipe off or otherwise clean the lens 33a from the outside of the casing 33 without having recourse to removing some component members of the disc transfer means. If desired, such an opening may be provided, rather than in the tray structure 10, in any member forming part of the disc transfer means if the member is to intervene between the lens 33a and the tray structure 10 when the tray structure 10 and the casing 33 are in the above mentioned positions thereof with respect to the turntable. Where it is desired to have the lens 33a cleaned from the outside of the housing 2, an opening may be formed in the upper panel of the housing 2 as indicated at 2a in FIG. 1. This opening 2a is also located to align with the lens 33a when the tray structure 10 and the casing 33 are in the above mentioned positions thereof with respect to the turntable. A suitable cover element 2b may be movably or detachably attached to the upper panel of the housing 2 to close the opening 2a except when the opening 2a is to be used. The openings thus provided in the tray structure 10 and the housing 2 may be used not only for the cleaning of the lens 33a but for the calibration of the radiation power to be achieved of the optical signal pickup means enclosed within the casing 33.

The combination of the slider 31 and casing 33 constructed and arranged as above described form a carriage assembly 34 in the disc transfer means of the automatic disc player embodying the present invention.

The support structure 28 also forming part of the disc playback means has a left side portion carrying a screw shaft 37 as shown in FIGS. 6 and 10. The screw shaft 37 extends in parallel with the guide rods 30a and 30b, viz., in the direction of the arrow Y and has its opposite end portions journaled in lug portions projecting from the left side portion of the support structure 28. In front of this screw shaft 37 is positioned a reversible motor 38 having an output shaft having a center axis in the direction of the arrow Y and carrying a drive pulley thereon, though not seen in the drawings. In association with this driven pulley is provided a driven pulley 39 which is securely mounted on a shaft axially aligned with and coupled to the screw shaft 37. An endless belt is passed between these drive and driven pulleys and completes drive transmission means from the motor 38 to the screw shaft 37. The slider 28 forming part of the above mentioned carriage assembly 34 has a bracket member 41 securely attached by means of, for example, screws to the left side portion of the slider 31 as shown in FIG. 10. The bracket member 41 is preferably constructed of a spring steel plate which is elastically deformable in the direction of the arrow Z. The bracket member 41 extends over the screw shaft 37 and has a semicylindrical nut member 42 securely attached to the lower face of the bracket member 41. The nut member 42 is held in mesh with the screw shaft 37 so that the slider 31 carrying the nut member 42 is driven for forward or backward movement along the screw shaft 37 when the screw shaft 37 is rotated in either direction about the center axis thereof. The screw shaft 37, the nut member 42 and the above mentioned drive transmission means to drive the screw shaft 37 from the motor 38 form, in combination, carriage drive means to drive the carriage assembly 34 to move back and forth in the direction of the arrow Y with respect to the support structure 28 and accordingly to the housing 2.

Figure 11:
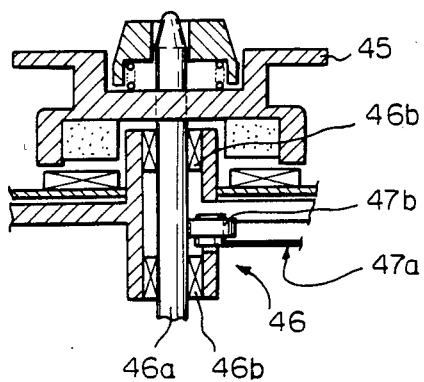
FIG. 11 is a vertical sectional view showing the turntable structure forming part of the automatic disc player embodying the present invention.
Figure 12:
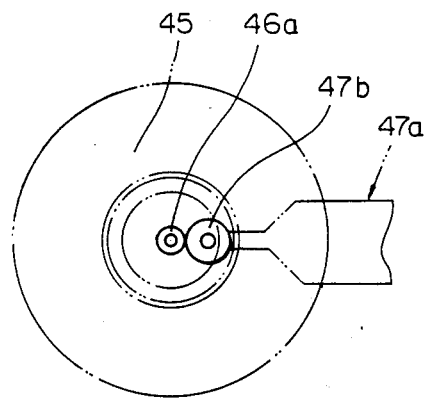
FIG. 12 is a plan view of the turntable structure illustrated in FIG. 11.

FIGS. 11 and 12 of the drawings show the construction and arrangement of a turntable assembly including the turntable which has been referred to frequently. The turntable assembly is supported on the above mentioned support structure 28 and is positioned on an extension of the direction of movement of the above described carriage assembly 34, largely intervening between the carriage assembly 34 and the above described carriage drive means. As illustrated in FIGS. 11 and 12, the turntable, now designated by reference numeral 45, is supported by a spindle-drive motor 46 and is directly driven for rotation by the motor 46. The spindle-drive motor 46 has an output shaft 46a journaled in bearings 46b received in a bearing retainer portion of the support structure 28. Ordinarily a gap of the order of about ten microns exists between the motor output shaft 46a and each of the bearings 46b. Such a gap is minimized by shaft retaining means 47a including an idler roller 47b held in rollable engagement with an axial portion of the shaft 46a as shown. The output shaft 46a of the spindle-drive motor 46 is maintained in close contact with the bearings 46b by means of this idler roller 47b and assures smooth and uniform rotation of the turntable 45. The previously mentioned disc playback means of the automatic disc player embodying the present invention is constituted by the combination of the support structure 28, guide rods 30a and 30b, carriage assembly 34, carriage drive means, turntable 45, spindle-drive motor 46 and idler 47b as above described. As shown in FIGS. 6 and 8, the casing 33 forming part of the carriage assembly 34 has in its front wall portion a rearwardly recessed concavity 33b having an arcuate cross section on a horizontal plane. This concavity 33b is provided to accommodate portions of the turntable 45 and the spindle-drive motor 46 when the carriage assembly 34 is held in its home position with respect to the turntable 45.

The support structure 28 is coupled to the chassis structure 7 by means of the four screws 29 respectively associated with the rubber bushings 29' as previously noted. The rubber bushings 29' are used for the purpose of protecting the above mentioned disc playback means, particular, the turntable 45 from shocks and vibrations that may be transferred thereto from the outside of the player system as, typically, when the player is installed on a motor vehicle. In this instance, it is preferable the locations at which the support structure 28 is coupled to the chassis structure 7 by such fastening means be such that are disposed symmetrically on a circle having its center at the middle point between an extension of the axis of rotation of the turntable 45 and the middle point of the linear locus to be described by the center of gravity of the carriage assembly 34. Such arrangement of the rubber bushings 29' will provide a maximum shock and vibration attenuation efficiency by the bushings 29'. While the particular arrangement of the bushings 29' is prefered in view of the displacement of the center of gravity of the carriage assembly 34, approximately similar results will be achieved if the locations of the rubber bushings 29' are determined so that the bushings are disposed symmetrically on a circle having its center at the center of gravity of the disc playback means when the center of gravity of the carriage assembly 34 is located at the middle point of the linear locus to be described by the center of gravity of the carriage assembly 34.

Figure 5:
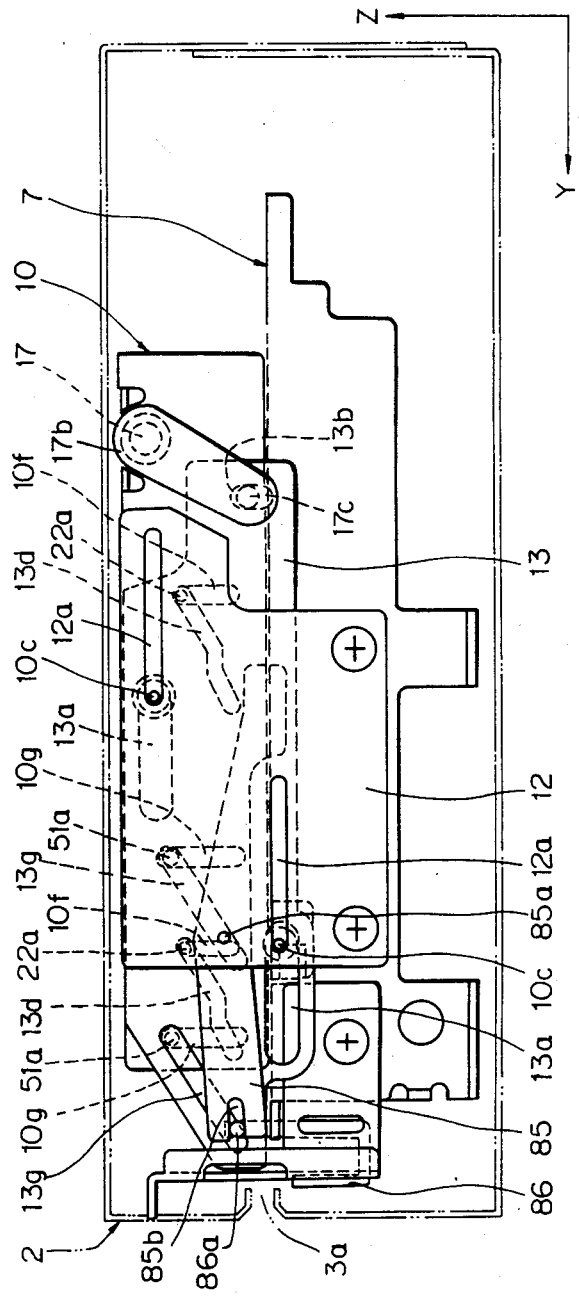
FIG. 5 is also a side elevation view of the internal construction of the automatic disc player embodying the present invention but viewed from the opposite side of the player.

The automatic disc player embodying the present invention further comprises disc clamp means for claming a disc 5 on the turntable 45 after the disc 5 has been conveyed to the predetermined position with respect to the turntable 45. In the embodiment of the automatic disc player herein shown, such disc clamp means comprises a largely rectangular horizontal support plate 51 which is positioned between the right and left movable members 13 and 14 and above the turntable 45 as will be seen from FIGS. 2, 3 and 6. The support plate 51 has a pair of lug portions depending downwardly from each of the right and left side edges thereof. Guide pins 51a project rightwardly from the two lug portions at the right edge of the plate 51 and are slidably received in slots 10g formed in the right side wall portion of the base member 10a of the tray structure 10. Likewise, guide pins 51a project leftwardly from the two lug portions at the left edge of the plate 51 and are slidably received in slots 10g formed in the left side member 10b of the tray structure 10. The pins 51a at one edge of the support plate 51 and the slots 14g in the movable member 13 and 14 are respectively aligned with the pins 51a at the other edge of the support plate 51 and the slots 13g in the other movable member in the direction of the arrow X. Each of the slots 10g is elongated in the direction of the arrow Z so that the support plate 51 is vertically movable with respect to the tray structure 10 over distances limited by the lengths of the slots 10g. The pins 51a on the support plate 51 extend through these slots 10g in the tray structure 10 and are further slidably received in cam holes 13g and 14g formed in the right and left movable members 13 and 14, respectively, the cam holes 13g in the movable member 14 being respectively aligned with the cam holes 14g in the movable member 14 each in the direction of the arrow X. These cam holes 13g and 14g are linearly inclined upwardly rearwardly, so that the support plate 51 carried on the movable members 13 and 14 by the pins 51a is to be guided to move upwardly when driven to move rearwardly with respect to the movable members 13 and 14 and accordingly to the turntable 45. Thus, the support plate 51 has an upper disc release position (shown in FIG. 3) with the pins 51a located at the uppermost and rearmost ends of the cam slots 13g and 14g as shown in FIGS. 4 and 5 and a lower disc clamp position with the pins 51a located at the lowermost and foremost ends of the cam slots 13g and 14g. The support plate 51 is vertically movable between these two positions with respect to the movable membrs 13 and 14 and accordingly to the turntable 45. In the description to follow, the previously mentioned stepping cam holes 13d and 14d in the movable members 13 and 14 will be referred to as first cam holes, while the cam straight inclined cam holes 13g and 14g thus formed additionally in the movable members 13 and 14 will be referred to as second cam holes. It may be noted in connection with these cam holes that all these first and second cam holes 13d, 14d, 13g and 14g have equal lengths each in the direction of the arrow Y.

On the support plate 51 is positioned a circular clamping member 52 which is positioned above and in alignment with the turntable 45 and which is rotatably mounted on the support plate 51 through a circular opening 51b (FIG. 3) formed in the support plate 51. The clamping member 52 has an upper disc portion positioned above a plane flush with the upper face of the support plate 51 and a lower annular portion positioned below a plane flush with the lower surface of the support plate 51. A circumferential groove 52c is thus formed between the upper disc portion and lower annular portion of the clamping member 52, which thus engages the support plate 51 through this groove 52c, as will be seen from FIG. 3. The clamping member 52 is thus slightly movable vertically with respect to the support plate 51 through the opening 51b. On the lower face of the upper disc portion of the clamping member 52 is attached an annular permanent magnet 52a which urges the clamping member 52 have its upper disc portion attached to the upper face of the support plate 51 as shown in FIG. 3. For this purpose, each of the support plate 51 and clamping member 52 is constructed of magnetic metal such as steel. The upper face of the clamping member 52 is preferably lined with a soft web 52b of, for example, felt which protects the clamping member 52 from being brought into direct contact with the inner surface of the upper panel of the housing 2 when the support plate 51 held in the above mentioned upper disc release position is caused to move vertically by a shock transmitted thereto. Such a soft web may be provided, rather than on the clamping member 52, on the inner surface of the upper panel of the housing 2 in such a manner as to register with at least a portion of the upper face of the clamping member 52, though not shown in the drawings.

Figure 2:
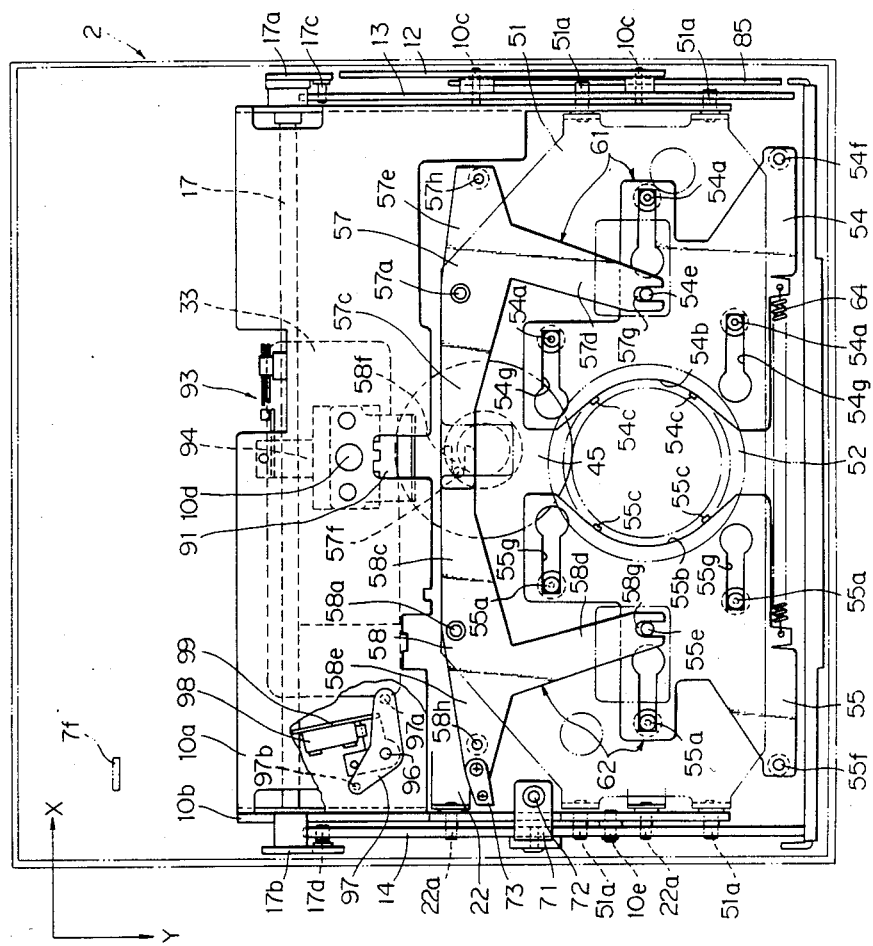
FIG. 2 is a plan view showing the internal construction of the automatic disc player embodying the present invention.

A pair of retainer plates 54 and 55 are positioned immediately below the support plate 51 as shown in FIG. 2. These retainer plates 54 and 55 are spaced apart from each other in the direction of the arrow X across the clamping member 52 and are retained to the support plate 51 by means of guide pins 54and 55a projecting downwardly from the support plate 51, three of the pins being provided for each of the retainer plates 54 and 55. The guide pins 54a and 55a engaging each of the retainer plates 54 and 55 are slidably received in slots 54g formed in each retainer plate and elongated each in the direction of the arrow X. The pins 54a and the elongated slots 54g of one retainer plate 54 are respectively aligned with the pins 55a and the elongated slots 55g of the other retainer plate 55, and each of the slots 54g and 55g terminates in an enlarged circular inner end portion. The pins 54a engaging the retainer plate 54 are located in symmetry with the pins 55a engaging the retainer plate 55 with respect to a center line which extends through the center axis of the clamping member 52 in the direction of the arrow Y. The retainer plates 54b and 55b and 55 have arcuate edge portions 54 shaped conformingly to and extending in and along the circumferential groove 52c in the clamping member 52 as will be seen from FIG. 2. Two or any suitable number of lugs project from the arcuate edge portion 54b or 55b of each of the retainer plates 54 and 55 and project into the circumferential groove 52c in the clamping member 52.

At the rear of the retainer plates 54 and 55 are provided a pair of synchronizer plates 57 and 58, respectively, which are also positioned immediately below the support plate 51 as shown in FIG. 2. These synchronizer plates 57 and 58 are pivotally coupled to the support plate 51 by means of vertically extending pivot pins 57a and 58a, respectively, and are thus rotatable independently of each other about these pins on a horizontal plane below the support plate 51. The pins 57a and 58a thus serving as pivot elements are located in symmetry with each other also with respect to a center line which extends through the center axis of the clamping member 52 in the direction of the arrow Y. The synchronizer plates 57 and 58 have inner side arm portions 57c and 58c extending toward each other away from the pins 57a and 58a, respectively, front arm portions 57d and 58d extending generally forwardly away from the pins 57a and 58a, respectively, and outer side arm portions 57e and 58e extending opposite to the inner side arm portions 57c and 58c, respectively, as shown. The inner side arm portion 58c of the right synchronizer plate 58 is formed with a slot 58f which is elongated in the direction of the arrow X and which is open at the extreme end of the arm portion 58c. On the other hand, the inner side arm portion 57c of the left synchronizer plate 58 57 has an end portion raised over and overlapping an end portion of the arm portion 58c of the synchronizer plate 58 as will be seen in FIG. 6. A pin 57f projects downwardly from this raised end portion of the arm portion 57c and is slidably received in the elongated slot 58f in the synchronizer plate 58, as indicated by broken lines in FIG. 2. The forwardly extending front arm portions 57d and 58d of the synchronizer plates 57 and 58 are also formed with slots 57g and 58g, respectively, which are open at the extreme ends of the arm portions 57d and 58d. The slots 57g and 58g in the synchronizer plates 57 and 58 are elongated each in the direction of the arrow Y as shown in FIG. 2 and have slidably received therein pins 54e and 55e projecting upwardly from the retainer plates 54 and 55, respectively. Thus, the synchronizer plates 57 and 58 are provided to allow the retainer plates 54 and 55 to move synchronously with each other with respect to the support plate 51.

In the description to follow, the combination of the right retainer and synchronizer plates 54 and 57 will be referred to as first position holding means 61 and, likewise, the combination of the left retainer and synchronizer plates 55 and 58 will be referred to as second position holding means 62. These pairing first and second position holding means 61 and 62 are positioned on a plane perpendicular to the axis of rotation of the clamping member 52 and engage the clamping member 52 at two or more points along the circumference of the clamping member 52 as by means of the lug portions 54c and 55c of the retainer plates 54 and 55. The first and second position holding means 61 and 62 are urged to have the lug portions 54c and 55c of the retainer plates 54 and 55 forced against the peripheral surface defining the radially inner end of the circumferential groove 52c in the clamping member 52. For this purpose, a helical tension spring 64 is anchored at one end to a front end portion of the retainer plate 54 and at the other to a front end portion of the retainer plate 55 as shown in FIG. 2, thus urging the retainer plates 54 and 55 toward each other in the direction of the arrow X. The first and second position holding means 61 and 62 and this tension spring 64 constitute in combination alignment means for maintaining the clamping member 52 in a predetermined position with respect to the support plate 51 in the embodiment shown. Furthermore, the combination of the alignment means, support plate 51 and clamping member 52 as well as the members and elements associated with these constitutes the disc clamp means adapted to have a disc 5 clamped onto the turntable 45 after the disc 5 has been conveyed to the predetermined position with respect to the turntable 45.

The above mentioned alignment means including the first and second position holding means 61 and 62 lends itself not only to the positioning of the clamping member 52 with respect to the support plate 51 but to positioning a disc 5 correctly on the disc transfer plate 22 after the disc 5 has been inserted into the automatic disc player through the slot 3a (FIG. 1) in the housing 2.

The first and second position holding means 61 and 62 are positioned on both sides of the path of a disc 5 to be transferred to the turntable 45 within the housing 2. Such position holding means 61 and 62 are movable on planes perpendicular to the plane on which the disc 5 is to be placed on the disc transfer plate 22 which forms part of the disc carrier means (which further comprises the tray structure 10 and the right and left movable members 13 and 14 as previously mentioned). On the lower face of the retainer plates 54 and 55 forming part of these first and second position holding means 61 and 62 are provided disc retaining pins 54f and 55f, respectively and on the lower face of the synchronizer plates 57 and 58 also forming part of the position holding means 61 and 62 are provided disc retaining pins 57h and 58h, respectively. The disc retaining pins 54f and 55f are located on outer side extensions protruding from front end portions of the retainer plates 54 and 55, respectively, and the disc retaining pins 57h and 58h are located on the previously mentioned outer side arm portions 57e and 58e of the synchronizer plates 57 and 58, respectively, as shown in FIG. 2. These disc retaining pins 54f, 55f, 57h and 58h extend in directions normal to the plane on which the disc 5 is to be placed on the disc transfer plate 22 and are used as disc retaining elements to engage the disc while the disc is being transferred to the turntable 45 within the housing 2. In this instance, the tension spring 64 provided between the retainer plates 54 and 55 serves to urge these disc retaining pins 54f, 55f, 57h and 58h to engage the edge of the disc being moved inwardly in the housing 2. Each of the disc retaining pins 54f, 55f, 57h and 58h is tapered toward its lower end as shown in FIG. 6. When the disc 5 is being loaded into the automatic disc player or being withdrawn therefrom, the disc 5 is retained by these pins 54f, 55f, 57h and 58h and is urged to move downwardly toward the upper face of the disc transfer plate 22 due to the downward forces which result from the tapered surfaces of the pins.

The automatic disc player embodying the present invention further comprises disc releasing means adapted to have a disc 5 released from the hereinbefore described alignment means.

As shown in FIGS. 2 and 6, the disc releasing means comprises a relatively small-sized bracket member 71 having a generally L-shaped cross section. The bracket member 71 forms part of or is securely connected to the left movable member 14 and projects rightwardly from the upper end of the movable member 14. A pin 72 projects downwardly from this bracket member 71 and, in association with this pin 72, there is provided a pawl member 73 which is secured to the outer side arm portion 58e of the left synchronizer plate 58 by means of, for example, screws as shown in FIG. 2. The pin 72 and the pawl member 73 are located so that the former is to be brought into engagement with the latter at the front end of the latter when the tray structure 10 movable with the disc transfer plate 22 assumes the previously mentioned predetermined position in which the disc 5 placed on the transfer plate 22 has its center axis substantially aligned with the axis of rotation of the turntable 45. As the movable members 13 and 14 are moved rearwardly after the tray structure 10 has reached this position with respect to the turntable 45, the pin 72 on the movable member 14 presses the pawl member 73 rearwardly and causes the left synchronizer plate 58 to turn clockwise in FIG. 2 about the axis of the pivot pin 58a with respect to the support plate 51. The turning motion of the synchronizer plate 58 is transmitted on one hand through the inner side arm portion 58c of the plate 58 to the inner side arm portion 57c of the right synchronizer plate 57 through the pin 57f on the arm portion 57c and causes the synchronizer plate 57 to turn counter clockwise in FIG. 2 about the axis of the pivot pin 57a with respect to the support plate 51. As a result of the clockwise and counter clockwise turn of the synchronizer plates 57 and 58, the pins 57h and 58h on the outer side arm portions 57e and 58e of the plates 57 and 58 are caused to move rearwardly with respect to the disc transfer plate 22 and are thus disengaged from the disc 5 placed on the transfer plate 22. The turning motion of the synchronizer plate 58 is on the other hand transmitted through the front arm portion 58d of the plate 58 to the left retainer plate 55 through the pin 55e on the plate 55 and causes the retainer plate 55 to move outwardly in the direction of the arrow X with respect to the support plate 51. The turning motion of the right synchronizer plate 57 in turn is transmitted through the front arm portion 57d of the plate 57 to the right retainer plate 54 through the pin 54e on the plate 54 and also causes the retainer plate 54 to move outwardly in the direction of the arrow X with respect to the support plate 51. The right and left retainer plates 54 and 55 respectively forming part of the first and second position holding means 61 and 62 are thus caused to move away from each other in the direction of the arrow X against the force of the tension spring 64 as the movable members 13 and 14 are moved rearwardly after the tray structure 10 has reached the predetermined position with respect to the turntable 45. The retainer plates 54 and 55 being thus moved away from each other, the pins 54f and 55f thereon are also moved away from each other and are in the result disengaged from the disc 5 on the disc transfer plate 22. The disc 5 on the disc transfer plate 22 is in this fashion released from the pins 54f, 55f, 57h and 58h forming part of the first and second position holding means 61 and 62.

The pin 72 on the movable member 14 is tapered downwardly, viz., in a direction in which the disc transfer plate 22 is to move toward the turntable 45, as will be seen from FIG. 6. The pawl member 73 fastened to the synchronizer plate 58 is thus allowed to engage the pin 72 by an edge-to-point contact with the pin 72 and produces a minimum of frictional force between the pin 72 and the pawl member 73 when the pawl member 73 is being moved by the pin 72. This provides smooth and unresisted movement of the retainer plates 54 and 55 and synchronizer plates 57 and 58 during loading and unloading of the disc 5. The tapered configuration of the pin 72 will further contribute to imparting a thrust to the synchronizer plate 58 being turned clockwise.

The automatic disc player embodying the present invention further comprises antistatic brush means to remove static charges from the disc 5 to be loaded into the player through the slot 3a in the housing 2.

Figure 13:
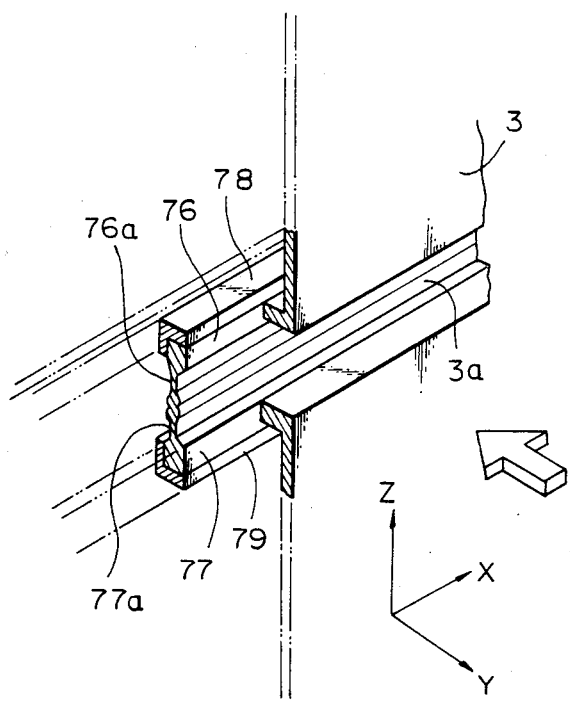
FIG. 13 is a partially cutaway view showing the arrangement of double loading preventive means included in the automatic disc player embodying the present invention.

Such antistatic brush means comprises a pair of, upper and lower, strips 76 and 77 which are disposed immediately inside the horizontally elongated slot 3a in the front panel 3 of the housing 2 as shown in FIG. 13 of the drawings. These strips 76 and 77 are formed of an electrically conductive, resilient material such as carbon-dispersed rubber. The resilient strips 76 and 77 extend along the slot 3a throughout the length of the slot 3a and have their upper and lower end portions bonded to or otherwise securely attached to fixtures 78 and 79, respectively, extending along the strips 76 and 77. The fixtures 78 and 79 are secured to the inner face of the front panel 3 of the housing 2 so that the resilient strips 76 and 77 are held in position with respect to the slot 3a. Each of the fixtures 78 and 79 is also formed of an electrically conductive material and is grounded through an appropriate conductor (not shown). The resilient strips 76 and 77 have lower and upper end portions which are either held in contact with or slightly spaced apart from each other at the rear of the slot 3a and are resiliently deformable toward and away from the slot 3a. The disc 5 inserted through the slot 3a into the housing 2 can thus be passed between the lower and upper ends of the strips 76 and 77 so that the static charges which may have been deposited on the surfaces of the disc can be transferred to the strips 76 and 77 and ultimately to ground. The dust which may have been deposited on the disc 5 to be loaded into the automatic disc player can thus be precluded from being admitted into the automatic disc player. Each of the strips 76 and 77 is preferably thinned between the upper and lower end portions thereof as indicated at 76a and 77a to provide an increased degree of resiliency. Also preferably, each of the respective lower and upper end portions of the strips 76 and 77 is shaped to have a rounded cross section as shown, to provide smoothness of passage of the disc 5 between the strips.

The automatic disc player embodying the present invention further comprises means for preventing loading of two or more discs into the automatic disc player. Such double loading preventive means comprises a bell-crank lever 85 attached to the inner face of the bracket member 12 secured to the chassis structure 7, as shown in FIGS. 2, 5 and 6. The lever 85 thus intervening between the bracket member 12 and the right movable member 13 extends generally in the direction of the arrow Y and is pivotally mounted on the bracket member 12 by means of a pivot pin 85a extending in the direction of the arrow X. The lever 85 is caused to turn clockwise in FIG. 5 about the pivot pin 85a as the movable member 13 moves rearwardly to load a disc 5 into the automatic disc player. In front of the lever 85 is positioned a slot closing member 86 having a generally J-shaped cross section and movable upwardly and downwardly with respect to the chassis structure 7 along an appropriate guide member (not shown) attached to, for example, the housing 2. The slot closing member 86 has a pin 86a projecting rightwardly from a lower portion of the member 86. The pin 86 is slidably received in an open-ended slot 85b formed in a front arm portion of the bell-crank lever 85 and elongated generally in the direction of the arrow Y. The slot closing member 86 is movable upwardly from and downwardly back to a predetermined vertical position shown in FIG. 5 as the bell-crank lever 85 is caused to turn clockwise and counter clockwise in FIG. 5. When the slot closing member 86 is held in this position, the front lug portion of the slot closing member 86 is located below a plane flush with the lower end of the slot 3a in the housing 2 as will be seen from FIG. 5. When the movable member 13 is moved rearwardly with respect to the housing 2 during loading of a disc 5, the bell-crank lever 85 is driven to turn clockwise in FIG. 5 about the pivot pin 85a. This causes the slot closing member 86 to move upwardly from the above mentioned vertical position thereof to a position having its front lug portion located at the rear of the slot 3a, thus forming an obstacle to entry of another disc into the automatic disc player through the slot 3a. The double loading preventing means is thus driven by the movement of the movable member 13 and, accordingly, uses no extra drive means proper to such means.

Figure 14A:
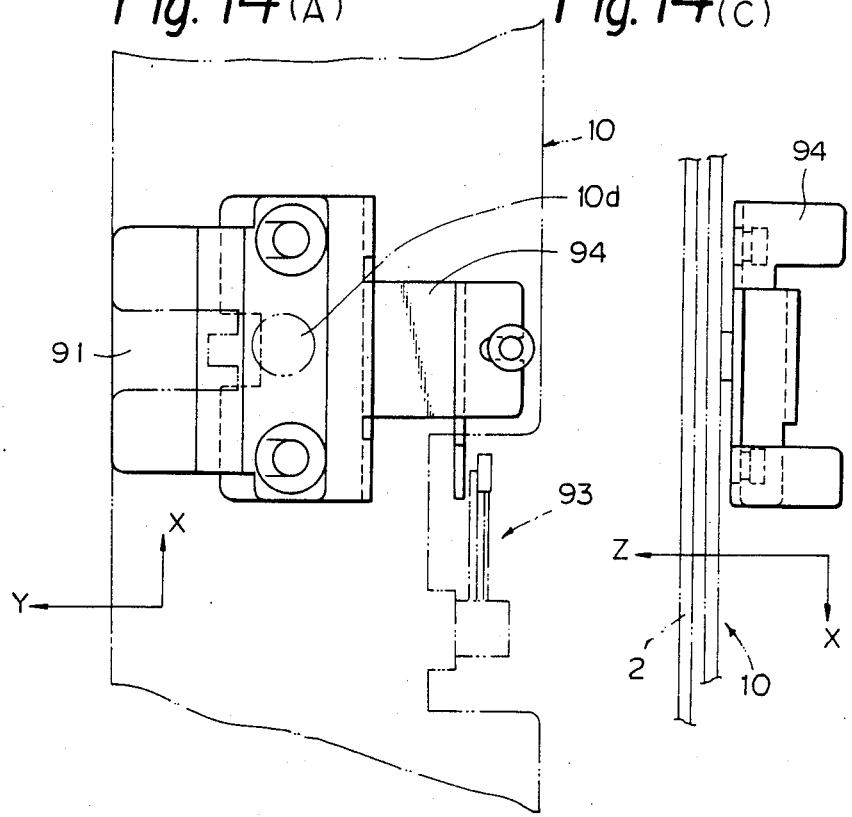
FIG. 14 shows the arrangement of a disc guide member also included in the automatic disc player embodying the present invention, wherein (A), (B) and (C) are a plan view, a side elevation view, and a rear end view, respectively, of such arrangement.
Figure 14C:
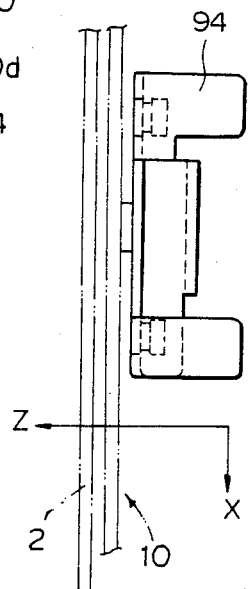
Figure 14B:
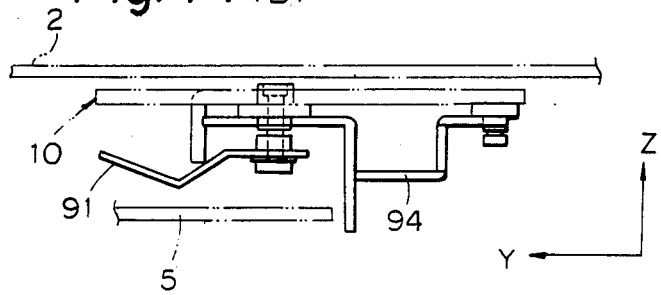

The automatic disc player embodying the present invention further comprises disc guide means for guiding the movement of the disc 5 from the slot 3a to the disc transfer plate 22. Such guide means comprises a guide member 91 located on the path of the disc 5 from the slot 3a to the disc transfer plate 22, viz., at the rear of the disc transfer plate 22 and is securely attached to, for example, the base member 10a of the tray structure 10 by means of, for example, studs as shown in views (A) and (C) of FIG. 14. The guide member 91 is spaced apart from the lower face of the base member 10a and has a front end portion inclined upwardly in forward direction as will be best seen in view (B) of FIG. 14. The disc 5 which has been inserted into the housing 2 through the slot 3a in the front panel 3 and which is being moved deeper into the housing 2 is brought into sliding contact at its leading end with the lower surface of the inclined front end portion of the guide member 91 and is thus enabled to correctly reach the predetermined position on the disc transfer plate 22. The guide member 91 is formed with a circular opening aligned with the opening 10d in the tray structure 10 for providing an unobstructed access to the objective lens 33a n the carriage assembly 33 (FIGS. 8 and 9).

When a disc 5 is placed correctly on the disc transfer plate 22, the disc 5 has its leading end located below a rear end portion of the base member 10a of the tray structure 10. A playback re-start switch unit 93 is provided below this rear end portion of the tray structure 10 as shown in views (A), (B) and (C) of FIG. 14 and is secured to the base member 10a of the tray structure 10 by means of, for example, a screw as shown in FIG. 6. This playback re-start switch unit 93 is arranged to be actuated when the disc placed on the disc transfer plate 22 is moved slightly rearwardly beyond the predetermined position on the transfer plate 22. The re-start switch unit 93 is engageable with the edge of the disc 5 at the leading end of the disc through an actuating member 94 which has a portion located in front of the switch unit 93 and movable in the direction of the arrow Y, the portion of the member 94 being biased forwardly. As will be understood more clearly as the description proceeds, the playback re-start switch unit 93 is to be actuated when the disc 5 which has once been played back is to be used for a second time without withdrawing the disc from the automatic disc player. The switch unit 93 thus forms part of a suitable driver circuit connected to the coil unit of the main drive motor 20.

The automatic disc player embodying the present invention further comprises mechanical detecting means responsive to the movements of the disc 5 and the tray structure 10 and operative to indicate that the disc 5 is positioned correctly on the disc transfer plate 22. In the embodiment herein shown, such detecting means comprises a pivot rod 96 projecting downwardly from the lower face of a left end portion of the base member 10a of the tray structure 10 as shown in FIG. 2. A bell-crank lever 97 is pivotally mounted on this pivot rod 96 and has two arm portions extending in opposite directions away from the pivot rod 96 as also shown in views (A), (B) and (C) of FIG. 15. Pins 97a and 97b project downwardly from these opposite arm portions, respectively, of the bell-crank lever 97. The pin 97a projecting from one arm portion is located to be engageable with the edge of the disc 5 correctly placed on the disc transfer plate 22 as shown in view (B) of FIG. 15. This arm portion of the lever 97 is per se engageable with an actuator element projecting from a disc position detector switch unit 98 which is supported on a switch support member 99 which is also pivotally mounted on the pivot rod 96. The bell-crank lever 97 is thus operative to press the actuator element of the switch unit 98 when turned counter clockwise in FIG. 15 about the center axis of the pivot rod 96 as shown in views (B) and (C) of FIG. 15. The switch support member 99 is urged to turn clockwise in the drawings (FIGS. 2 and 15) about the axis of the pivot rod 96 by means of appropriate biasing means such as a helical tension spring (not shown) anchored at one end to the support member 99 and at the other to, for example, the tray structure 10. This biasing means is also effective to urge the lever 97 to turn clockwise in the drawings about the axis of the pivot rod 96. The chassis structure 7 has a lug portion 7f upstanding from the left end of the main chassis member 7a and located in the vicinity of the rear end of the chassis member 7a as shown in FIG. 6. The pin 97b projecting from the other arm portion of the bell-crank lever 97 is located to be engageable with this lug portion 7f of the chassis structure 7 as shown in view (C) of FIG. 15 when the tray structure 10 is moved to a predetermined position with respect to the chassis structure 7 from, for example, the position illustrated in FIG. 2. The disc position detector switch unit 98 is adapted to close when a disc 5 is correctly placed on the disc transfer plate 22 and is electrically connected to the main drive motor 20 through an appropriate control circuit (not shown).

As shown in FIGS. 6 and 10, the support structure 28 supporting the previously described carriage assembly 34 has a position detector switch unit 101 mounted on the left side portion thereof. The detector switch unit 101 is responsive to backward movement of the carriage assembly 34 on the support structure 28 and has an actuator element 101a engageable with a projection 31e on the slider 31 movably mounted on the support structure 28. The actuator element 101a and the projection 31e are located so that the projection 31e is brought into pressing engagement with the actuator element 101a when the carriage assembly 34 being moved forwardly of the support structure 28 reaches a predetermined home position with respect to the housing 2. The position detector switch unit 101 is thus operative to produce a signal indicating that the carriage assembly 34 has been moved back to the home position at the end of each playback operation.

In association with the tray structure 10 is provided a position detector switch unit 103 which is responsive to the movement of the tray structure 10 with respect to the chassis structure 7. The detector switch unit 103 is mounted on the left side wall portion of the chassis structure 7 as shown in FIG. 4. The detector switch unit 103 has an actuator element engageable with a portion of the tray structure 10 when the tray structure 10 is in a predetermined rearmost limit position on the chassis structure 7. At the rear of this position detector switch unit 103 is provided a position detector switch unit 104 which is responsive to the movement of the left movable member 14 with respect to the chassis structure 7. The position detector switch unit 104 is mounted on the left side wall portion of the chassis structure 7 by means of a bracket member 105 as shown in FIGS. 4 and 6. The detector switch unit 104 has an actuator element engageable with a portion of the movable member 14 when the movable member 14 is moved to a predetermined rearmost limit position with respect to the chassis structure 7. The position detector switch unit 104 is thus operative to produce a signal indicating the loading of a disc into the automatic disc player and the clamping of the disc on the turntable 45 are complete.

The above described playback re-start switch unit 93 and the various detector switch units 98, 101, 103 and 104 as well as the control buttons 6 shown in FIG. 1 are all electrically connected to a control module provided within the housing 2, though not shown in the drawings. The various drive means such as the motors 20, 38 and 46 as hereinbefore described are started and shut off at timings dictated by signals supplied from this control module.

Description will now be made with concurrent reference to FIGS. 1 to 18 regarding the operation of the automatic disc player constructed as hereinbefore described.

Operation of the automatic disc player starts with manual insertion of a disc 5 into the housing 2 through the slot 3a in the front panel 3 of the housing 2. While the disc 5 is being inserted through the slot 3a, the disc is passed between the resilient strips 76 and 77 (FIG. 13) behind the slot 3a and is cleared of static charges which may have been deposited on the surfaces of the disc. The disc 5 thus inserted through the horizontally elongated slot 3a is first brought into engagement at its leading edge portion with the disc retaining pins 54f and 55f on the retainer plates 54 and 55 forming part of the first and second position holding means 61 and 62, respectively. As the disc 5 is moved forwardly through the slot 3a, the disc forces the pins 54f and 55f to move away from each other in the direction of the arrow X. It therefore follows that the retainer plates 54 and 55 are caused to move away from each other with respect to the support plate 51 against the force of the tension spring 64. This causes the synchronizer plates 57 and 58 to turn clockwise and counter clockwise in FIG. 2 about the center axes of the pivot pins 57a and 58a, respectively. After the center axis of the disc 5 thus travelling forwardly is moved past the line joining the center axes of the pins 54f and 55f, the pins 54f and 55f are allowed to move toward each other so that the disc 5 is urged to move forwardly by the force of the spring 64 which acts on the retainer plates 54 and 55 and can therefore be moved forwardly if the disc 5 is released from the operator's hand. As the retainer plates 54 and 55 are thus moved toward each other with respect to the support plate 51 by the force of the tension spring 64, the synchronizer plates 57 and 58 are caused to turn in counter clockwise and clockwise directions, respectively, in FIG. 2 toward their initial positions with respect to the support plate 51. The disc 5 admitted into the housing 2 is moved under the guidance of the guide member 91 located at the rear end of the tray structure 10 until the disc 5 reaches the proper position on the disc transfer plate 22 which at this stage is still held at rest together with the tray structure 10 and the movable members 13 and 14. The disc 5 thus positioned correctly on the disc transfer plate 22 is retained in this position by the disc retaining pins 54f and 55f on the retainer plates 54 and 55 and the disc retaining pins pins 57h and 58h on the synchronizer plates 57 and 58. In this fashion, the disc 5 can be maintained in the correct position on the disc transfer plate 22 if any shocks or vibrations are transferred to the housing 2 as where the automatic disc player is installed on a motor vehicle.

Figure 15A:
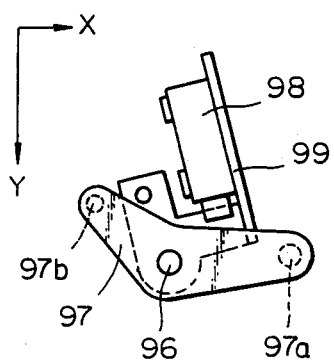
FIG. 15 shows the arrangement of a disc position detector switch unit further included in the automatic disc player embodying the present invention, wherein (A), (B) and (C) are views showing different conditions of the arrangement.
Figure 15B:
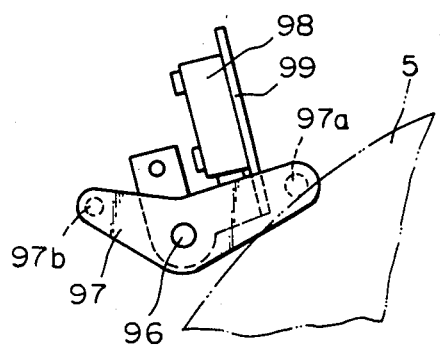
Figure 15C:
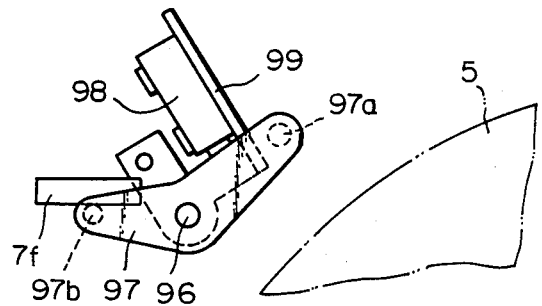

When the disc 5 is positioned on the disc transfer plate 22, the disc has its leading edge portion brought into engagement with the pin 97a on the bell-crank lever 97 as shown in view (B) of FIG. 15. This causes the lever 97 to turn counter clockwise about the axis of the pivot rod 96 against the force of the associated spring (not shown) and accordingly brings the arm portion supporting the pin 97a into pressing engagement with the actuator element of the switch unit 98, causing the switch unit 98 to close. In response to an output signal accordingly supplied from the switch unit 98, the main drive motor 20 is actuated to start and drives the left movable member 14 for rearward movement with respect to the chassis structure 7. In this instance, the power output of the motor 20 is transmitted through the reduction gear unit 19 (FIG. 4) to the rack member 14c integral with or secured to the movable member 14 and causes the movable member 14 to move rearwardly with respect to the chassis structure 7. Under these conditions, the locking pin 26 on the lever 25 forming part of the lock/unlock means is received in the cam slot 14e in the movable member 14 so that the movable member 14 and accordingly the disc transfer plate 22 are held against movement with respect to the tray structure 10. Thus, the movable members 13 and 14, tray structure 10 and disc transfer plate 22 are moved rearwardly as a single unit with respect to the chassis structure 7 by the power output from the main drive motor 20. While these members and structure are being thus moved with respect to the chassis structure 7, the locking pin 26 slides on the upper face of the chassis structure 7 along the left edge of the structure 7.

As the unit of the movable members 13 and 14, tray structure 10 and disc transfer plate 22 is rearwardly moved a predetermined distance from its initial position within the housing 2, the disc 5 on the transfer plate 22 is almost in its entirety admitted into the housing 2. Approximately at this point of time, the pin 97b on the bell-crank lever 97 (FIG. 15) is brought into abutting engagement with the upstanding lug portion 7f of the chassis structure 7 as shown in view (C) of FIG. 15. The bell-crank lever 97 is therefore forcibly held in the angular position pressing the actuator element of the disc position detector switch unit 98, allowing the main drive motor 20 to drive the movable member 14 for further rearward movement with respect to the chassis structure 7. The further rearward movement of the movable member 14 causes the bell-crank lever 97 to turn counter clockwise about the axis of the pivot rod 96 against the force of the associated spring, with the result that the arm portion of the lever 97 carrying the pin 97a is disengaged from the disc 5 on the disc transfer plate 22, as shown in view (C) of FIG. 15. The disc 5 placed on the disc transfer plate 22 now reaches a position having its center axis substantially aligned with the axis of rotation of the turntable 45 positioned below the transfer plate 22.

Figure 16:
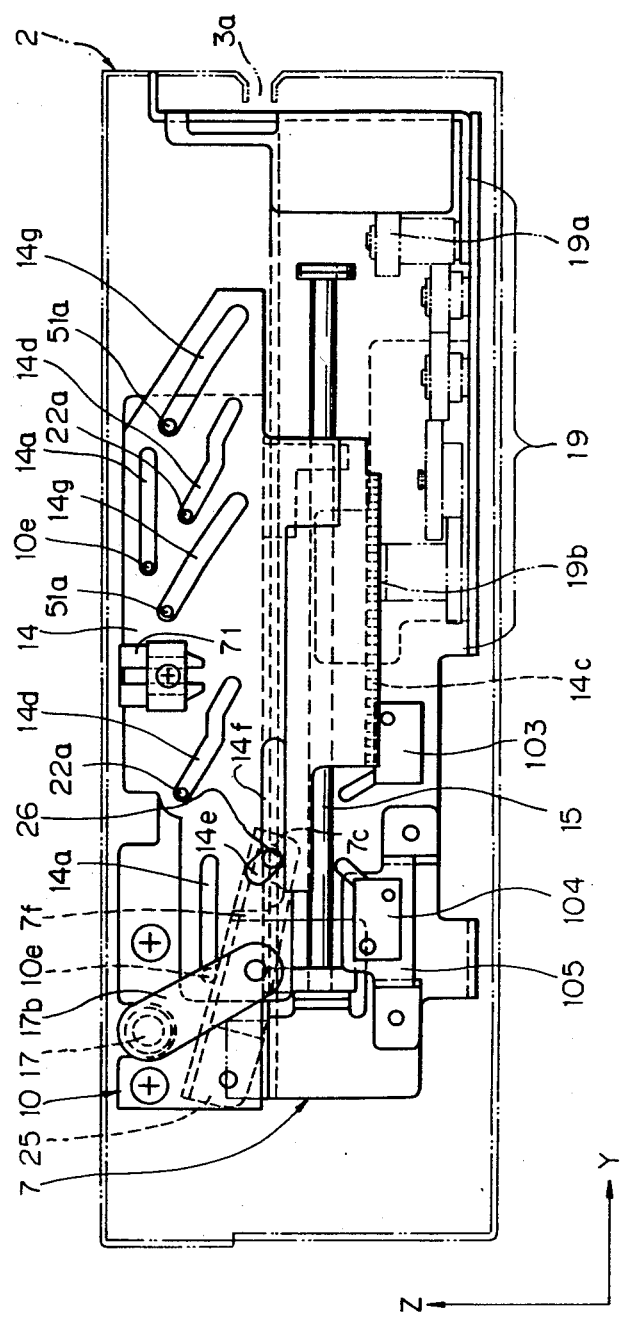
FIGS. 16 and 17 are views similar to FIG. 4 but show conditions of the automatic disc player different from those of the automatic disc player shown in FIG. 4.

Simultaneously as the disc 5 is released from the bell-crank lever 97, the locking pin 26 on the lever 25 is withdrawn from the cam slot 14e and enters the elongated slot 14f in the movable member 14 as shown in FIG. 16 of the drawings. As the pin 26 is thus admitted into the elongated slot 14e, it is also received in the cutout 7c in the chassis structure 7 so that the tray structure 10 is locked to the chassis structure 7 and accordingly to the housing 2 by means of the locking pin 26. With the locking pin 26 being located in the elongated slot 14f in the movable member 14, the movable member 14 is now allowed to move further rearwardly with respect to the tray structure 10 and the disc transfer plate 22 allowed to move vertically with respect to the tray structure 10. It therefore follows that the movable members 13 and 14 alone are permitted to further move rearwardly with respect to the housing 2 until the movable members 13 and 14 ultimately reaches the positions represented by the position of the member 14 in FIG. 17. As the movable members 13 and 14 are thus moved rearwardly with respect to the tray structure 10 and accordingly to the disc transfer plate 22, the disc transfer plate 22 is caused to move downwardly with respect to the chassis structure 10 with its guide pins 22a moved stepwise downwardly in the stepping cam holes 13d and 14d and its guide pins 22a' moved stepwise downwardly in the stepping cam holes 13d' and 14d' in the movable members 13 and 14, respectively. With the disc transfer plate 22 thus moved downwardly with respect to the tray structure 10 and accordingly to the turntable 45, the disc 5 on the transfer plate 22 is landed on the turntable 45 when or at least by the time the pins 22a and 22a' reach the foremost and lowermost ends of the stepping cam holes 13d, 14d, 13d' and 14d' in the movable members 13 and 14 as shown in FIG. 17.

Figure 18:
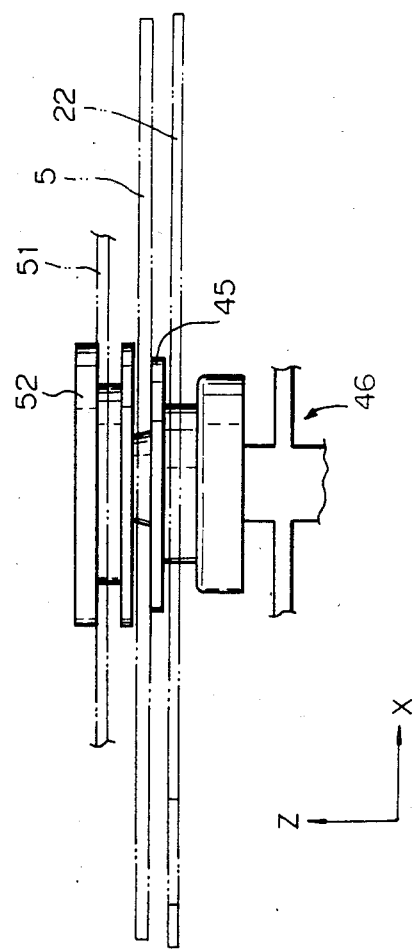
FIG. 18 is a schematic eielvation view showing the arrangement of the turntable and the disc clamp means which form part of the automatic disc player embodying the present invention.

With the movement of the movable members 13 and 14 with respect to the tray structure 10, furthermore, the guide pins 51a of the support plate 51 forming part of the disc clamp means are caused to lower along the slots 13g and 14g in the movable members 13 and 14, respectively, as will be also seen from FIG. 17. It therefore follows that the support plate 51 and accordingly the clamping member 52 carried thereon are caused to move downwardly until the clamping member 52 has its lower annular portion received on the disc 5 on the turntable 45 as shown in FIG. 18 of the drawings. The distance of movement of the support plate 51 between its uppermost position (which corresponds to the locations of the rearmost and uppermost ends of the slots 13d and 14d) and the position thus seated on the disc 5 on the turntable 45 (which position largely corresponds to the locations of the foremost and lowermost ends of the slots 13d and 14d) is selected to be, for example, about 8.5 mm. In this instance, the distance of movement of the disc transfer plate 22 between its uppermost position with respect to the turntable 45 (which position corresponds to the locations of the rearmost and uppermost ends of the holes 13d, 14d, 13d' and 14d') and its lowermost position (which corresponds to the locations of the foremost and lowermost ends of the holes 13d, 14d, 13d' and 14d') is selected to be about 6.5 mm. The difference of about 2 mm between the distance of movement of the disc transfer plate 22 and that of the support plate 51 results from the existence of the horizontal intermediate portions of the stepping cam holes 13d, 14d, 13d' and 14d' along which the disc transfer plate 22 is to be moved.

Simultaneously as the disc 5 is clamped between the turntable 45 and the clamp member 52, the movable members 13 and 14 reach their rearmost limit positions with respect to the housing 2. When the movable member 14 is moved to such a position, it is brought into pressing engagement with the actuator element of the position detector switch unit 104 as shown in FIG. 17 and causes the switch unit 104 to close. A control signal is supplied from the previously mentioned control module to the main drive motor 20, which is accordingly brought to a stop. The automatic disc player is now ready for playback operation. It may be noted that the backward movement of the right movable member 13 causes the lever 85 of the double loading preventive means (FIG. 5) to turn clockwise in FIG. 5 so that the slot closing member 86 engaging the lever 85 is raised and located immediately at the rear of the slot 3a in the housing 2, thereby preventing loading of another disc into the housing 2.

When the playback start button 6a out of the control buttons 6 (FIG. 1) on the housing 2 is depressed manually, the spindle drive motor 46 and the motor 38 for driving the carriage assembly 34 are actuated to start and the automatic disc player starts the playback operation with the disc 5 carried on the turntable 45. When the carriage assembly 34 reaches a predetermined limit position with respect to the support structure 28, the motors 38 and 46 are brought to a stop so that the turntable 45 stops rotation and the carriage assembly 34 stops movement along the screw shaft 37. The main drive motor 20 is now actuated to start rotation in the opposite direction, driving the tray structure 10, movable members 13 and 14, disc transfer plate 22 and disc clamping member 52 for movement through a reversal of the motions hereinbefore described. These members and units are thus returned to their respective initial positions in the housing 2 and the carriage assembly 34 is moved back to the initial home position thereof with the motor 38 also actuated to start rotation in the opposite direction. The disc 5 which has been played back is in this manner conveyed backwardly in the housing 2 and is withdrawn out of the housing 2 through the slot 3a. If it is desired that the disc 5 which has once been played back be played back for a second time, the playback re-start switch unit 93 is closed when the disc is manually pressed rearwardly while it remains on the turntable 45.

While a preferred embodiment of an automatic disc player according to the present invention has thus far been described, such an embodiment is simp.ly illustrative of the gist of the present invention and may thus be changed or modified in numerous manner if desired.

Figure 19:
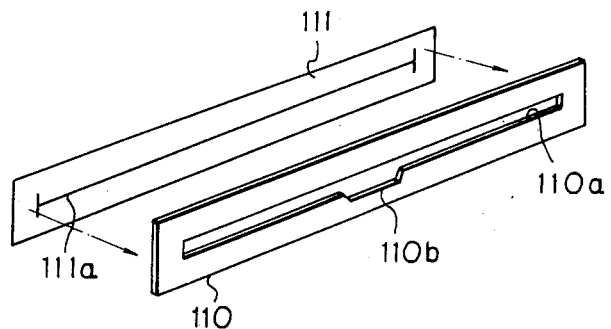
FIG. 19 is a disassembled perspective view showing a front guide plate which may be provided in the embodiment of a disc player according to the present invention.

As shown in FIG. 19, for example, a horizontally elongated front guide plate 110 may be positioned behind the resilient strips 76 and 77 forming part of the previously described double loading preventive means (FIG. 13). This front guide plate is fixed in an appropriate manner to the housing 2 and is formed with a slot 110a which is elongated coextensively with the slot 3a in the front panel 3 of the housing 2. The guide plate 110 is provided to guide the movement of the disc 5 to be withdrawn from the housing 2 upon completion of a playback operation. Thus, the disc 5 which has been transferred back from the turntable 45 to the disc transfer plate 22 is passed through the slot 110a in the guide plate 110 and is enabled to advance correctly toward the slot 3a in the housing 2 through the gap between the resilient strips 76 and 77 of the double loading preventive means. If the disc 5 used happens to be warped downwardly due to, for example, the weight thereof, the disc may collide at its foremost end against the inner face of the lower portion of the guide plate 110. The elongated slot 110a may thus be shaped to have a downwardly enlarged region 110b in a middle portion of the lower half of the plate 110 as shown, thus permitting the disc 5 to clear over the lower half of the guide plate 110 when being moved forwardly toward the slot 3a in the housing 2. If desired, furthermore, the inner face of the guide plate 110 may be lined with a relatively soft web 111 of, for example, felt formed with a slit 111a which is lengthwise coextensive with the slot 110a in the guide plate 110. The lining of the soft web 110 is useful for preventing an ingress of dust deep into the disc player and for enabling the disc to pass softly through the guide plate 110.

Figure 20A:
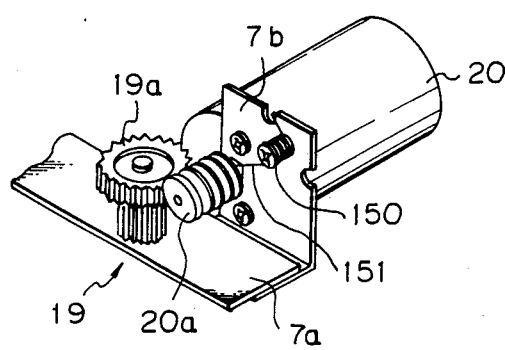
FIG. 20 shows the arrangement of means to prevent unusual oscillation of the output shaft of the motor used as a main drive motor in the embodiment of a disc player according to the present invention, wherein (A) is a perspective view of the motor and part of a reduction gear unit associated with the motor and (B) is an end view of the motor provided with such means.
Figure 20B:
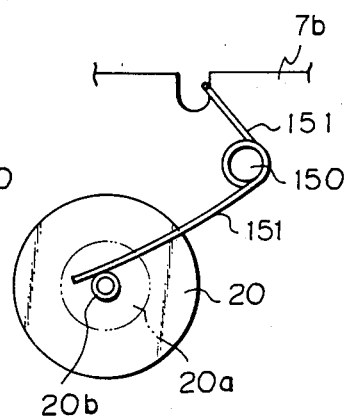

The main drive motor 20 used in the disc player embodying the present invention operates at speeds which may be as high as 6000 rpm. Rotation of the motor output shaft at such high speeds may cause the shaft to oscillate violently and produce booming noises from the motor 20. This phenomenon is serious especially where the power output from the motor is transmitted through gears as in the embodiment of the present invention in which the reduction gear unit 19 including the worm gear 20a is used as the power transmission means for the motor 20 as previously described. With a view to preventing the motor output shaft from being oscillated at high speeds, suitable biasing means may be provided to urge the motor output shaft constantly in a certain direction. FIG. 20 of the drawings shows an example of such arrangement, wherein the main drive motor 20 is shown mounted on the auxiliary chassis member 7b of the chassis structure 7. A pin 150 serving as an elongated spring retainer projects from the chassis member 7b in parallel with the motor output shaft 20b carrying the worm gear 20a. A helical torsion spring 151 has its helical portion received on this pin 150 and has one of its end portions anchored at the motor output shaft 20b and the other of its end portions anchored to the chassis member 7b through a slot formed therein as shown in view (B) of FIG. 19. The output shaft 20b of the main drive motor 20 is, accordingly. urged in the direction pressed upon by the spring 151 and is precluded from being oscillated in the opposite direction.

As has been described hereinbefore, an automatic disc player according to the present invention includes a housing (2) having an elongated slot (3a) through which a disc is to be inserted into the housing (2), disc playback means (including the support structure 28, guide rods 30a and 30b, carriage assembly 34, turntable 45, spindle motor 46 etc) accommodated within the housing, disc carrier means (including the tray 10 and the disc transfer plate 22) operative to convey the disc toward a predetermined position along a predetermined path within the housing after the disc is inserted through the slot in the housing, the disc carrier means having a surface portion (constituted by the upper face of the disc transfer plate 2) on which the disc is to be placed, and alignment means operative to move the disc correctly to the predetermined position after the disc is conveyed toward the predetermined position by the disc carrier means, wherein the alignment means comprises a pair of position holding means (61, 62) disposed on both sides of the aforesaid predetermined path and engageable with an edge portion of the disc concurrently at four locations (of the pins 54f and 55f; 57h and 58h) on a plane substantially parallel with the above mentioned surface portion of the disc carrier means, and biasing means (viz., the coil spring 64) urging the locations to move toward the edge portion of the disc while the disc is being engaged by the position holding means. The disc being conveyed toward the position to be played back is fixedly and correctly held in position on the disc carrier means until the disc is transferred from the carrier means to the playback means, even though shocks or vibrations are transferred to the housing during travelling of the disc.

What is claimed is:

1. An automatic disc player comprising a housing having an elongated slot; disc playback means accommoated within said housing including a turntable rotatably disposed within said housing, clamp means for clamping a disc mounted on said turntable and a pick-up movable radially of said turntable; and disc carrier means for conveying a disc inserted into said slot from a start position which is close to said slot up to said turntable and from said turntable to said start position, in which said carrier means includes:

container means for supporting said disc inserted into said slot;

four engaging members respectively engageable with the edge of said disc so as to cooperate with said container means thereby to hold said disc;

biasing means for resilently biasing said four engaging members to approach together;

support means for supporting said four engaging members while resiliently urging said four engaging members toward an engagement position in which said four engaging members are engageable with the edge of the disc as long as it is not actuated and for moving said four engaging members to a disengagement position in which said four engaging members are apart form the edge of the disc when it is actuated;

a conveyor member movable between said start position and a rear position which is close to said turntable, for conveying both of said container means and said support means; and release means mounted on said conveyor member for actuating said support means thereby to move said four engaging members to said disengagement position when said conveyer member reaches said rear position until the completion of the playback operation of said playback means.

2. An automatic disc player as set forth in claim 1, further including drive means operative to drive said disc carrier means for movement with respect to said housing, said drive means comprising a stationary member fast on said housing, an electric motor supported on said stationary member and having an output shaft, a spring retainer element fast on said stationary member, and a helical torsion spring having a helical portion received on said retainer element and having one of its end portions engaging the output shaft of the motor and the other of its end portions engaging said stationary member for urging the output shaft of the motor in a predetermined direction with respect to said housing.

3. An automatic disc player as set forth in claim 1, further comprising a guide member in the form of a plate fixedly positioned rearwardly of said slot and formed with an opening extending substantially coextensively with said slot in the housing for passing a disc through said opening in the guide member when the disc is being conveyed outwardly from the housing, said opening being provided with a recessed portion in a middle portion thereof.

4. An automatic disc player as set forth in claim 1, wherein said support means includes;
a support plate mounted on said support means;
a pair of slide plates respectively slidably mounted on said support plate and respectively carrying thereon two of said four engaging members; and
a pair of swing members mounted on said support plate to be swingable in synchronism with each other and respectively engaged with said slide plates, the remaining two of said four engaging members being mounted on said swing members.

5. An automatic disc player as set forth in claim 4, wherein each of said engaging members is a pin member having a generally circular cross section.

6. An automatic disc player as set forth in claim 5, wherein said support plate has a bore among said slide plates and swing members and said clamp means includes a clamping member loosely coupled with said bore.

7. An automatic disc player as set forth in claim 6, wherein said clamping member is engaged with said slide plates when said slide plates are close to each other.

8. An automatic disc player as set forth in claim 4, wherein said swing members are respectively generally T-shaped members engaged with each other at the first arms thereof and at the second arms thereof with said slide plates respectively and carrying said two engaging members at the third arms thereof respectively.

* * * * *